(12) United States Patent
Abramov

(10) Patent No.: US 7,191,676 B2
(45) Date of Patent: Mar. 20, 2007

(54) UNIVERSAL MULTIFARIOUS GEARBOX OF MUTUALLY DEFINITE UNITS AND METHOD THEREFORE

(76) Inventor: Vladimir Abramov, P.O. Box 22075, Eagan, MN (US) 55122-0075

( * ) Notice: Subject to any disclaimer, the term of this patent is extended or adjusted under 35 U.S.C. 154(b) by 310 days.

(21) Appl. No.: 10/667,561

(22) Filed: Sep. 22, 2003

(65) Prior Publication Data

US 2005/0005720 A1    Jan. 13, 2005

Related U.S. Application Data

(60) Provisional application No. 60/412,702, filed on Sep. 23, 2002.

(51) Int. Cl.
*F16H 3/08* (2006.01)
(52) U.S. Cl. .......................... 74/331; 74/333
(58) Field of Classification Search ................. 74/331, 74/335, 325–329, 333
See application file for complete search history.

(56) References Cited

U.S. PATENT DOCUMENTS

| | | | | |
|---|---|---|---|---|
| 3,916,714 A * | 11/1975 | Sisson et al. | .................. | 74/331 |
| 4,145,935 A * | 3/1979 | Herlitzek | ...................... | 74/331 |
| 4,245,519 A * | 1/1981 | Herlitzek | ...................... | 74/331 |
| 4,341,127 A * | 7/1982 | Stodt | ............................ | 74/333 |
| 4,392,391 A * | 7/1983 | Jameson et al. | ............... | 74/333 |
| 4,549,443 A * | 10/1985 | White | ........................ | 74/360 |
| 4,577,529 A * | 3/1986 | Romi | ................... | 74/665 GA |
| 4,637,269 A * | 1/1987 | Hasegawa et al. | ............ | 74/335 |
| 4,726,246 A * | 2/1988 | Whalen | ....................... | 74/360 |
| 4,823,639 A * | 4/1989 | Krause et al. | ................. | 74/360 |
| 5,117,702 A * | 6/1992 | Rodeghiero et al. | .......... | 74/359 |
| 5,249,475 A * | 10/1993 | McAskill | ...................... | 74/331 |
| 5,251,132 A * | 10/1993 | Bulgrien | ..................... | 701/67 |
| 5,471,892 A * | 12/1995 | Sherman | ..................... | 74/325 |
| 5,557,978 A * | 9/1996 | McAskill | ..................... | 74/331 |
| 5,927,145 A * | 7/1999 | Ahluwalia et al. | ............ | 74/331 |
| 6,190,280 B1* | 2/2001 | Horsch | ...................... | 475/209 |
| 6,244,123 B1* | 6/2001 | Hegerath et al. | ............. | 74/325 |
| 6,889,131 B2* | 5/2005 | Razzacki | ..................... | 701/55 |
| 2004/0040397 A1* | 3/2004 | Razzacki | ..................... | 74/335 |

\* cited by examiner

*Primary Examiner*—Tisha Lewis
(74) *Attorney, Agent, or Firm*—William R Berggren

(57) ABSTRACT

A gearbox for maximizing the number of torques produced with the least loss of energy by using a geometric sequence of terms of ratios for the gears and having the separation in the degree of the common ratio uniform for all the gearsets between the same two shafts. The gearbox has high number of useable torques to gears plus shafts ratio. The gearbox can be used for gearboxes in any types of machines where torques or speeds are used.

17 Claims, 16 Drawing Sheets

FIG. 1A
COMBINATIONS OF ENGAGABLE PINIONS

| FORWARD TORQUES | 2 PINIONS GROUP C | 3 PINIONS GROUP D | 2 PINIONS GROUP B | 2 PINIONS GROUP A | REVERSE TORQUES | PINION |
|---|---|---|---|---|---|---|
| 1 | 111 | 115 | 133 | 129 | 1 | 107 |
| 2 | 111 | 122 | 133 | 129 | 2 | 107 |
| 3 | 111 | 116 | 133 | 129 | 3 | 107 |
| 4 | 111 | 115 | 125 | 129 | | |
| 5 | 111 | 122 | 125 | 129 | | |
| 6 | 111 | 116 | 125 | 129 | | |
| 7 | 111 | 115 | 133 | 136 | 4 | 107 |
| 8 | 111 | 122 | 133 | 136 | 5 | 107 |
| 9 | 111 | 116 | 133 | 136 | 6 | 107 |
| 10 | 111 | 115 | 125 | 136 | | |
| 11 | 111 | 122 | 125 | 136 | | |
| 12 | 111 | 116 | 125 | 136 | | |
| 13 | 110 | 115 | 133 | 129 | 7 | 107 |
| 14 | 110 | 122 | 133 | 129 | 8 | 107 |
| 15 | 110 | 116 | 133 | 129 | 9 | 107 |
| 16 | 110 | 115 | 125 | 129 | | |
| 17 | 110 | 122 | 125 | 129 | | |
| 18 | 110 | 116 | 125 | 129 | | |
| 19 | 110 | 115 | 133 | 136 | 10 | 107 |
| 20 | 110 | 122 | 133 | 136 | 11 | 107 |
| 21 | 110 | 116 | 133 | 136 | 12 | 107 |
| 22 | 110 | 115 | 125 | 136 | | |
| 23 | 110 | 122 | 125 | 136 | | |
| 24 | 110 | 116 | 125 | 136 | | |

FIG. 1B
FOUR GROUPS OF NINE GEARSETS WITH DEFINITE RATIOS

| GROUP A 2 GEARSETS #/RATIO | GROUP B 2 GEARSETS #/RATIO | GROUP C 2 GEARSETS #/RATIO | GROUP D 3 GEARSETS #/RATIO |
|---|---|---|---|
| 137 / 1 | 134 / $1/R^2$ | 112 / 1 | 118 / $R^2$ |
| 130 / $1/R^{12}$ | 126 / $1/R^8$ | 113 / $1/R^3$ | 123 / R |
| | | | 117 / 1 |

FIG. 2A
COMBINATIONS OF ENGAGABLE PINIONS

| FORWARD TORQUES | 3 PINIONS GROUP B | 4 PINIONS GROUP D | 2 PINIONS GROUP A | 1 PINION GROUP S | REVERSE TORQUES | PINION |
|---|---|---|---|---|---|---|
| 1 | 233 | 229 | 214 | 210 | 1 | 207 |
| 2 | 233 | 224 | 214 | 210 | 2 | 207 |
| 3 | 233 | 219 | 214 | 210 | 3 | 207 |
| 4 | 233 | 228 | 214 | 210 | 4 | 207 |
| 5 | 234 | 229 | 214 | 210 | 5 | 207 |
| 6 | 234 | 224 | 214 | 210 | 6 | 207 |
| 7 | 234 | 219 | 214 | 210 | 7 | 207 |
| 8 | 234 | 228 | 214 | 210 | 8 | 207 |
| 9 | 240 | 229 | 214 | 210 | 9 | 207 |
| 10 | 240 | 224 | 214 | 210 | 10 | 207 |
| 11 | 240 | 219 | 214 | 210 | 11 | 207 |
| 12 | 240 | 228 | 214 | 210 | 12 | 207 |
| 13 | 233 | 229 | 215 | 210 | 13 | 207 |
| 14 | 233 | 224 | 215 | 210 | 14 | 207 |
| 15 | 233 | 219 | 215 | 210 | 15 | 207 |
| 16 | 233 | 228 | 215 | 210 | 16 | 207 |
| 17 | 234 | 229 | 215 | 210 | 17 | 207 |
| 18 | 234 | 224 | 215 | 210 | 18 | 207 |
| 19 | 234 | 219 | 215 | 210 | 19 | 207 |
| 20 | 234 | 228 | 215 | 210 | 20 | 207 |
| 21 | 240 | 229 | 215 | 210 | 21 | 207 |
| 22 | 240 | 224 | 215 | 210 | 22 | 207 |
| 23 | 240 | 219 | 215 | 210 | 23 | 207 |
| 24 | 240 | 228 | 215 | 210 | 24 | 207 |

FIG. 2B
FOUR GROUPS OF TEN GEARSETS WITH DEFINITE RATIOS

| GROUP A 2 GEARSETS #/RATIO | GROUP B 3 GEARSETS #/RATIO | GROUP D 4 GEARSETS #/RATIO | GROUP S 1 GEARSET #/RATIO |
|---|---|---|---|
| 217 / 1 | 241 / 1 | 230 / $R^8$ | 211 / $1/R^8$ |
| 216 / $1/R^{12}$ | 236 / $1/R^4$ | 231 / $R^5$ | |
| | 235 / $1/R^8$ | 225 / $R^6$ | |
| | | 221 / $R^7$ | |

FIG. 2C
COMBINATIONS OF ENGAGABLE PINIONS AFTER JOIN TWO SPLIT SHAFTS

| FORWARD TORQUES | 3 PINIONS GROUP B | 4 PINIONS GROUP D |
|---|---|---|
| 25 | 233 | 220 |
| 26 | 233 | 226 |
| 27 | 233 | 227 |
| 28 | 233 | 219 |
| 29 | 234 | 220 |
| 30 | 234 | 226 |
| 31 | 234 | 227 |
| 32 | 234 | 219 |
| 33 | 240 | 220 |
| 34 | 240 | 226 |
| 35 | 240 | 227 |
| 36 | 240 | 219 |

FIG. 2D
TWO GROUPS OF SEVEN GEARSETS WITH DEFINITE RATIOS

| GROUP B 3 GEARSETS GEARSET#/ RATIO | GROUP D 4 GEARSETS GEARSET#/ RATIO |
|---|---|
| 241/1 | 230/ $R^8$ |
| 236/ $1/R^4$ | 231/ $R^5$ |
| 230/ $1/R^8$ | 225/ $R^6$ |
|  | 221/ $R^7$ |

FIG. 2E
COMBINATIONS OF ENGAGABLE PINIONS FOR WORKING ORGAN

| FORWARD TORQUES | 1 PINION GROUP S | 2 PINIONS GROUP B | REVERSE TORQUES | PINION |
|---|---|---|---|---|
| 1 | 210 | 214 | 1 | 207 |
| 2 | 210 | 215 | 2 | 207 |

FIG. 2F
TWO UNITS WITH SPLIT
SHAFT ENGAGED

| GROUP A<br>2 GEARSETS<br>#/RATIO | GROUP S<br>1 GEARSETS<br>#/RATIO |
|---|---|
| 217/1 | 211/ 1/R$^8$ |
| 216/1/R$^{12}$ | |

FIG. 2.1A
DRIVE OPPOSITE SHAFT WITH COMBINATIONS
OF ENGAGABLE PINIONS

| FORWARD<br>TORQUES | 3 PINIONS<br>GROUP B | 4 PINIONS<br>GROUP D |
|---|---|---|
| 1 | 233 | 220 |
| 2 | 233 | 226 |
| 3 | 233 | 227 |
| 4 | 233 | 219 |
| 5 | 234 | 220 |
| 6 | 234 | 226 |
| 7 | 234 | 227 |
| 8 | 234 | 219 |
| 9 | 240 | 220 |
| 10 | 240 | 226 |
| 11 | 240 | 227 |
| 12 | 240 | 219 |

FIG.2.1B
RATIOS FOR GEARSETS SHOWN

| GROUP B<br>3 GEARSETS<br>#/RATIO | GROUP D<br>4 GEARSETS<br>#/RATIO |
|---|---|
| 241/1 | 230/ R$^8$ |
| 236/ 1/R$^4$ | 231/ R$^5$ |
| 230/ 1/R$^8$ | 225/ R$^6$ |
| | 221/ R$^7$ |

FIG. 2.1E
DRIVE OPPOSITE SHAFT WITH COMBINATIONS OF
ENGAGABLE PINIONS FOR WORKING ORGAN

| FORWARD<br>TORQUES | 2 PINION<br>GROUP A1 | 2 PINIONS<br>GROUP S1 | REVERSE<br>TORQUES | PINION |
|---|---|---|---|---|
| 1 | 220 | 210 | 1 | 207 |
| 2 | 219 | 210 | 2 | 207 |

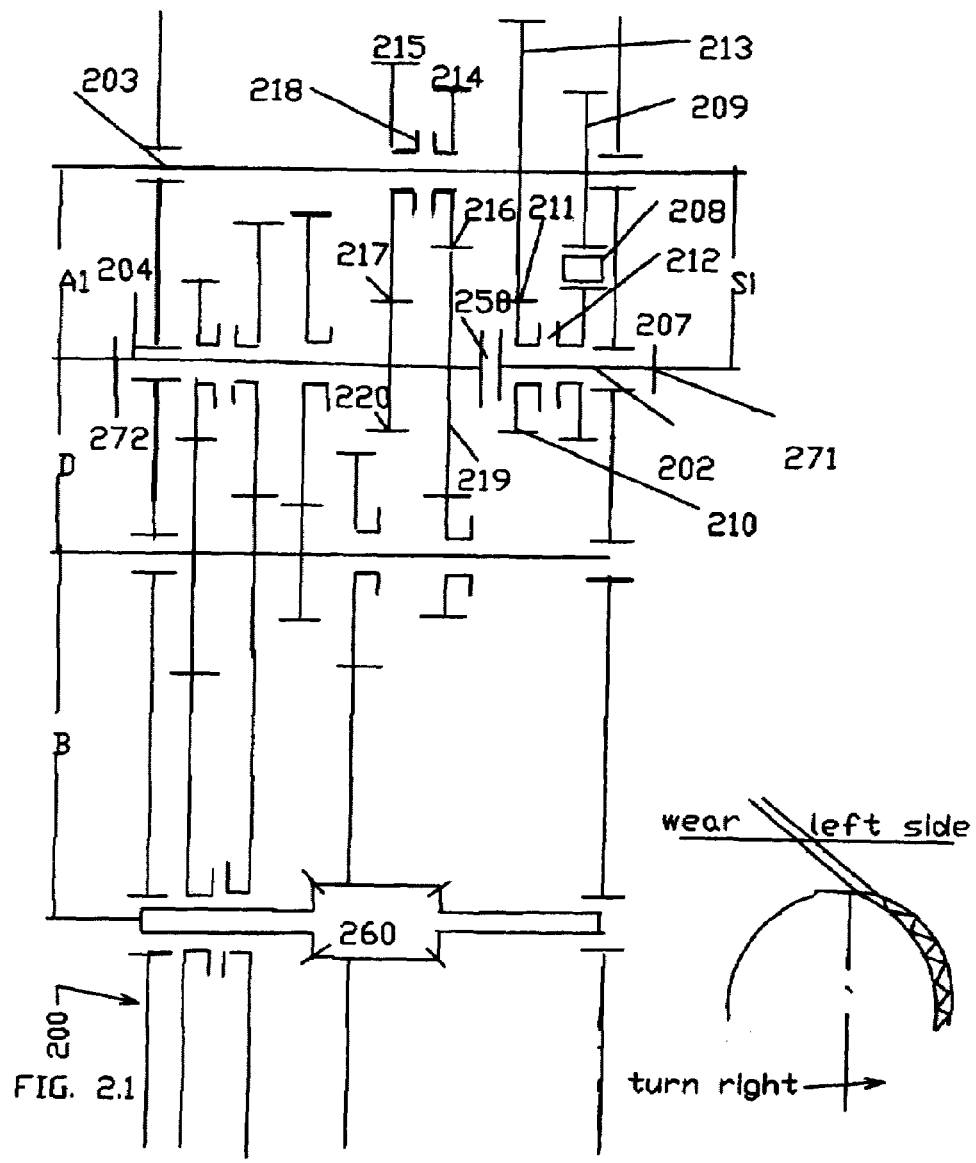
FIG. 2.1
FIG. 2.1P

FIG 2.1F
TWO UNITS IF FIRST SPLIT SHAFT
JOIN TO WORKING ORGAN

| GROUP A1<br>2 GEARSETS<br>#/RATIO | GROUP S1<br>1 GEARSETS<br>#/RATIO |
|---|---|
| 219/1 | 213/ $R^8$ |
| 220/$R^{12}$ | |

FIG. 3A
COMBINATIONS OF ENGAGABLE PINIONS

| FORWARD TORQUES | 2 PINIONS GROUP B | 6 PINIONS GROUP D | 2 PINIONS GROUP A | REVERSE TORQUES | PINION |
|---|---|---|---|---|---|
| 1 | 310 | 314 | 338 | 1 | 306 |
| 2 | 310 | 329 | 338 | 2 | 306 |
| 3 | 310 | 328 | 338 | 3 | 306 |
| 4 | 310 | 322 | 338 | 4 | 306 |
| 5 | 310 | 321 | 338 | 5 | 306 |
| 6 | 310 | 315 | 338 | 6 | 306 |
| 7 | 310 | 314 | 334 | | |
| 8 | 310 | 329 | 334 | | |
| 9 | 310 | 328 | 334 | | |
| 10 | 310 | 322 | 334 | | |
| 11 | 310 | 321 | 334 | | |
| 12 | 310 | 315 | 334 | | |
| 13 | 311 | 314 | 338 | 7 | 306 |
| 14 | 311 | 329 | 338 | 8 | 306 |
| 15 | 311 | 328 | 338 | 9 | 306 |
| 16 | 311 | 322 | 338 | 10 | 306 |
| 17 | 311 | 321 | 338 | 11 | 306 |
| 18 | 311 | 315 | 338 | 12 | 306 |
| 19 | 311 | 314 | 334 | | |
| 20 | 311 | 329 | 334 | | |
| 21 | 311 | 328 | 334 | | |
| 22 | 311 | 322 | 334 | | |
| 23 | 311 | 321 | 334 | | |
| 24 | 311 | 315 | 334 | | |

FIG. 3B
THREE GROUPS OF TEN GEARSETS WITH DEFINITE RATIOS

| GROUP A 2 GEARSETS #/RATIO | GROUP B 2 GEARSETS #/RATIO | GROUP D 6 GEARSETS #/RATIO |
|---|---|---|
| 335 / 1/R$^5$ | 311 / 1 | 317 / R$^5$ |
| 339 / 1/R$^{17}$ | 312 / 1/R$^6$ | 323 / R$^4$ |
| | | 324 / R$^3$ |
| | | 330 / R$^2$ |
| | | 331 / R |
| | | 316 / 1 |

FIG. 4A
COMBINATIONS OF ENGAGABLE PINIONS

| FORWARD TORQUES | 6 PINIONS GROUP D | 4 PINIONS GROUP A | REVERSE TORQUES | PINION |
|---|---|---|---|---|
| 1 | 408 | 438 | 1 | 405 |
| 2 | 409 | 438 | | |
| 3 | 415 | 438 | | |
| 4 | 416 | 438 | | |
| 5 | 423 | 438 | 2 | 405 |
| 6 | 424 | 438 | | |
| 7 | 408 | 437 | | |
| 8 | 409 | 437 | | |
| 9 | 415 | 437 | 3 | 405 |
| 10 | 416 | 437 | | |
| 11 | 423 | 437 | | |
| 12 | 424 | 437 | | |
| 13 | 408 | 433 | 4 | 405 |
| 14 | 409 | 433 | | |
| 15 | 415 | 433 | | |
| 16 | 416 | 433 | | |
| 17 | 423 | 433 | 5 | 405 |
| 18 | 424 | 433 | | |
| 19 | 408 | 429 | | |
| 20 | 409 | 429 | | |
| 21 | 415 | 429 | 6 | 405 |
| 22 | 416 | 429 | | |
| 23 | 423 | 429 | | |
| 24 | 424 | 429 | | |

FIG. 4B
TWO GROUPS OF TEN GEARSETS
WITH DEFINITE RATIOS

| GROUP A<br>4 GEARSETS<br>#/RATIO | GROUP D<br>6 GEARSETS<br>#/RATIO |
|---|---|
| 430 / $R^6$ | 426 / $1/R^6$ |
| 434 / 1 | 425 / $1/R^7$ |
| 439 / $1/R^6$ | 418 / $1/R^8$ |
| 440 / $1/R^{12}$ | 417 / $1/R^9$ |
|  | 411 / $1/R^{10}$ |
|  | 410 / $1/R^{11}$ |

FIG. 5A
COMBINATIONS OF ENGAGABLE PINIONS

| FORWARD TORQUES | 1 PINION GROUP S1 | 8 PINIONS GROUP D | 3 PINIONS GROUP A | 1 PINION GROUP S2 | REVERSE TORQUES | PINION |
|---|---|---|---|---|---|---|
| 1 | 511 | 522 | 513 | 535 | 1 | 507 |
| 2 | 511 | 544 | 513 | 535 | 2 | 507 |
| 3 | 511 | 543 | 513 | 535 | 3 | 507 |
| 4 | 511 | 537 | 513 | 535 | 4 | 507 |
| 5 | 511 | 536 | 513 | 535 | 5 | 507 |
| 6 | 511 | 530 | 513 | 535 | 6 | 507 |
| 7 | 511 | 529 | 513 | 535 | 7 | 507 |
| 8 | 511 | 523 | 513 | 535 | 8 | 507 |
| 9 | 511 | 522 | 518 | 535 | 9 | 507 |
| 10 | 511 | 544 | 518 | 535 | 10 | 507 |
| 11 | 511 | 543 | 518 | 535 | 11 | 507 |
| 12 | 511 | 537 | 518 | 535 | 12 | 507 |
| 13 | 511 | 536 | 518 | 535 | 13 | 507 |
| 14 | 511 | 530 | 518 | 535 | 14 | 507 |
| 15 | 511 | 529 | 518 | 535 | 15 | 507 |
| 16 | 511 | 523 | 518 | 535 | 16 | 507 |
| 17 | 511 | 522 | 517 | 535 | 17 | 507 |
| 18 | 511 | 544 | 517 | 535 | 18 | 507 |
| 19 | 511 | 543 | 517 | 535 | 19 | 507 |
| 20 | 511 | 537 | 517 | 535 | 20 | 507 |
| 21 | 511 | 536 | 517 | 535 | 21 | 507 |
| 22 | 511 | 530 | 517 | 535 | 22 | 507 |
| 23 | 511 | 529 | 517 | 535 | 23 | 507 |
| 24 | 511 | 523 | 517 | 535 | 24 | 507 |

FIG. 5B
FOUR GROUPS OF THIRTEEN GEARSETS WITH
DEFINITE RATIOS

| GROUP S1<br>1 GEARSET<br>#/RATIO | GROUP A<br>3 GEARSETS<br>#/RATIO | GROUP D<br>8 GEARSETS<br>#/RATIO | GROUP S2<br>1 GEARSET<br>#/RATIO |
|---|---|---|---|
| 512 / $R^5$ | 519 / $R^8$ | 525 / 1/R | 550 / 1/$R^{10}$ |
| | 520 / 1 | 531 / 1/$R^2$ | |
| | 514 / 1/$R^8$ | 532 / 1/$R^3$ | |
| | | 538 / 1/$R^4$ | |
| | | 539 / 1/$R^5$ | |
| | | 545 / 1/$R^6$ | |
| | | 546 / 1/$R^7$ | |
| | | 524 / 1/$R^8$ | |

FIG. 6A
COMBINATIONS OF ENGAGABLE PINIONS

| FORWARD TORQUES | 2 PINIONS GROUP A | 3 PINIONS GROUP B | 4 PINIONS GROUP D | REVERSE TORQUES | PINION |
|---|---|---|---|---|---|
| 1 | 605 | 621 | 628 | 1 | 648 |
| 2 | 605 | 621 | 629 | 2 | 648 |
| 3 | 605 | 621 | 635 | 3 | 648 |
| 4 | 605 | 621 | 636 | 4 | 648 |
| 5 | 605 | 615 | 628 | 5 | 648 |
| 6 | 605 | 615 | 629 | 6 | 648 |
| 7 | 605 | 615 | 635 | | |
| 8 | 605 | 615 | 636 | | |
| 9 | 605 | 614 | 628 | | |
| 10 | 605 | 614 | 629 | | |
| 11 | 605 | 614 | 635 | | |
| 12 | 605 | 614 | 636 | | |
| 13 | 604 | 621 | 628 | 7 | 648 |
| 14 | 604 | 621 | 629 | 8 | 648 |
| 15 | 604 | 621 | 635 | 9 | 648 |
| 16 | 604 | 621 | 636 | 10 | 648 |
| 17 | 604 | 615 | 628 | 11 | 648 |
| 18 | 604 | 615 | 629 | 12 | 648 |
| 19 | 604 | 615 | 635 | | |
| 20 | 604 | 615 | 636 | | |
| 21 | 604 | 614 | 628 | | |
| 22 | 604 | 614 | 629 | | |
| 23 | 604 | 614 | 635 | | |
| 24 | 604 | 614 | 636 | | |

FIG. 6B
THREE GROUPS OF TEN GEARSETS WITH
DEFINITE RATIOS

| GROUP A<br>2 GEARSETS<br>#/RATIO | GROUP B<br>3 GEARSETS<br>#/RATIO | GROUP D<br>4 GEARSETS<br>#/RATIO |
|---|---|---|
| 606 / $R^6$ | 616 / 1 | 638 / $1/R^6$ |
| 607 / $1/R^6$ | 617 / $1/R^4$ | 637 / $1/R^7$ |
|  | 622 / $1/R^8$ | 631 / $1/R^8$ |
|  |  | 630 / $1/R^9$ |

UNIVERSAL MULTIFARIOUS GEARBOX OF MUTUALLY DEFINITE UNITS AND METHOD THEREFORE

CROSS-REFERENCE TO RELATED APPLICATION

The subject matter of this application claims priority under 35 U.S.C. § 119(e) to the subject matter of U.S. Provisional Patent Application No. 60/412,702, filed Sep. 23, 2002, which is incorporated herein by reference.

BACKGROUND OF THE INVENTION

1. Field of the Invention

This invention relates to a gearbox with gearsets having degrees of constant ratios in a geometric sequence to provide an efficient ratio of torques or speeds to the number of gears and shafts in the gearbox.

2. Description of the Related Art

In the prior art, the efficiency of the gear ratios was not maximized for the most efficient transmission of power through a gearbox. The ratio of torque quantity to gears and shafts in the gearbox in U.S. Pat. No. 5,079,965 is 46%. It has three forward and three reverse torques provided by ten gears on three shafts. 6/(10+3)=46%. This is not an efficient ratio.

In U.S. Pat. No. 5,388,472 there are seven forward torques and one reverse torque provided by 18 gears on 4 shafts. The ratio of torque quantity to gears and shafts in the gearbox is 8/(18+4)=36%. This is not an efficient ratio.

In U.S. Pat. No. 5,735,175 there are five forward torques and one reverse torque provided by 13 gears on 4 shafts. The ratio of torque quantity to gears and shafts in the gearbox is 6/(13+4)=35%. This is not an efficient ratio.

For energy efficiency, it is desired to provide a high ratio of torque quantity to gears and shafts in gearboxes and to have as many forward and reverse speeds as possible with as small of a small gearbox as possible.

SUMMARY OF THE INVENTION

The gearbox produces a number of forward speeds or torques using gears whose sizes differ by degrees in a geometric sequence having a common ratio R. The gears used are selected by synchronized clutches having pinions meshing with gears to form gearsets in the gearbox.

There can be any number of gearsets to select from between two shafts in the gearbox. Gearsets between the same two shafts are in the same unit in the gearbox. The total number of forward gears available to select from in the gearbox is the product calculated by multiplying the number of gearsets in the units. For example if there are two units, one with 3 gearsets and the other with 4 gearsets, then there are 12 combinations thereof for producing 12 forward speeds.

The degrees of common ratio in the geometric sequences are different for each unit in the gearbox. Each unit in the gearbox has gearsets with the same degree of separation of the common ratio between the gearsets. For example if the degree of separation is 6 and there are three gearsets in the unit then the first gearset may have a ratio of $R^6$ the second gearset may have a ratio of 1 and the third gearset may have a ratio of $1/R^6$. The next unit will have a degree of separation other than six. Preferably all of the ratios have the number 1 in either the numerator or the denominator. The gearsets are formed between the pinions and gears or join gears in each unit.

The degree of common ratio of the gearsets for each unit is calculated by dividing the number of forward speeds or torques produced by the gearbox by the number of gearsets in the unit. For example if the gearbox has 24 speeds and a unit with 4 gearsets then that unit has 6 degrees of difference between the geatsets in the unit. The degree of common ratio of the gearsets for the next unit in the gearbox is calculated by dividing the degree of common ratio of the gearsets in the previous unit by the number of gearsets in the next unit etc. until the degree of common ratio for all units is calculated.

With the degree of difference in the common ratio of each gearset in the unit selected the designer may by design choice select any degree of the common ratio for the first gearset in the unit and then select the degree of the common ratio for the remaining gearsets in the unit.

The gearbox may also have other features such as a unit having a split shaft with a clutch for producing additional torques in the gearbox other than the product calculated by multiplying the number of gearsets in the units. The gearbox may also have a reverse pinion to provide reverse speeds. A differential may be used on the output shaft. The gears may have two faces of teeth which may be switched as the gears wear down. Further, the gearbox may come in sections with different frame members, the shafts extending between the sections.

Each unit in the gearbox may have a gearset with a 1 to 1 ratio such that the final gearbox output may also be selected to be 1 to 1. This may be achieved by combinations of ratios of gearsets of inverse values such as 1/R and R in the different units to provide a gearbox with an input to output ratio of 1 to 1.

The combination of using degrees of a common ratio for the gear sizes in a gearbox with the same degree of common ratio difference in each unit of the gearbox and using the ratio of the number speeds to shafts plus gears results in the most efficient gearbox.

OBJECTS OF THE INVENTION

It is an object of the invention to provide a gearbox with the best number of torques to gears and shafts ratio.

It is an object of the invention to provide the lowest energy loss gearbox.

It is an object of the invention to provide a low weight gearbox.

It is an object of the invention to provide the largest number of forward and reverse speeds on the least number of shafts with the least number of gears.

It is an object of the invention to use gears varying in size by degrees of a common ratio in a geometric sequence.

It is an object of the invention to provide a gearbox wherein the product gearsets in the units equals number of forward speeds or torques in the gearbox.

It is an object of the invention to provide a gearbox having gearsets wherein the gear teeth ratios in each unit differ from each other by the same degree in the geometric sequence having a common ratio.

It is an object of the invention to provide a gearbox having the same degree of common ratio of difference in the geometric sequences of all gearsets in the same unit.

It is an object of the invention to have a join gear between two gearsets in two units between three shafts.

It is the object of the invention to use addendum shifting to allow for two join gears on the same shaft wherein four gearsets, two in each of two units, have sufficient degrees of common ratios in the geometric sequences for equalizing the difference in distance between two shafts.

It is an object of the invention for all gearsets to use both the left and right sides of the gear teeth.

It is an object of the invention to use a differential affixed to output shaft.

It is an object of the invention to provide a reverse pinion on any shaft to produce reverse speeds.

It is an object of the invention to use split shafts with clutches to produce additional speeds or torques in the gearbox It is an object of the invention to provide multiple frame members for combinations of the gearset units to form a gearbox.

It is an object of the invention to provide a gearbox with the most efficient use of a largest quantity of forward and reverse torques for saving energy.

It is an object of the invention to provide gearbox with the largest quantity of forward and reverse torques for use in road or weather conditions.

It is an object of the invention to provide a gearbox with the option of having a ratio of 1 to 1 in each unit for a final gearbox output ratio of 1 to 1.

Other objects, advantages and novel features of the present invention will become apparent from the following description of the preferred embodiments when considered in conjunction with the accompanying drawings.

BRIEF DESCRIPTION OF THE DRAWINGS

FIG. 1A is a table of the possible combinations of selected pinions for engaging the gearsets shown in FIG. 1 to produce forward and reverse speeds.

FIG. 1B is a table showing the gearsets and the associated degree of the common ratios in the geometric sequence of the gearsets in the four units shown in FIG. 1.

FIG. 2A is a table shown in FIG. 2.

FIG. 2B is a table showing the gearsets and the associated degree of the common ratios in the geometric sequence of the gearsets in the four units shown in FIG. 2.

FIG. 2C is a table of the possible combinations of selected pinions for engaging the gearsets when using the split shafts as shown in FIG. 2.

FIG. 2D is a table of ratios of the gearsets in the gearset units if join of two split shafts FIG. 2E is a table of combinations of engageable pinions for a power take off on shaft 203.

FIG. 2F is a table of ratios of the gearsets in the two units with the split shaft engaged.

FIG. 2.1 is a schematic showing the turning over of the shafts in the gearbox as shown on FIG. 2 to use the other side of the gears.

FIG. 2.1A is a table of selected pinions for providing gearsets shown in FIG. 2.1.

FIG. 2.1B is a table of ratios of the gearsets in the two units shown in FIG. 2.1

FIG. 2.1E is a table of ratios of the gearsets in the two units if first split shaft join to working organ.

FIG. 2.1F is a table of ratios of the gearsets in the gearset units if first split shaft join to working organ.

FIG. 2.1P is a schematic showing the wear on the left side of gear tooth of the gears in FIG. 2.1.

FIG. 3A is a table of the possible combinations of selected pinions for engaging the gearsets shown in FIG. 3.

FIG. 3B is a table showing the gearsets and the associated degree of the common ratios in the geometric sequence of the gearsets in the three units shown in FIG. 3.

FIG. 4A is a table of the possible combinations of selected pinions for engaging the gearsets shown in FIG. 4.

FIG. 4B is a table showing the gearsets and the associated degree of the common ratios in the geometric sequence of the gearsets in the two units shown in FIG. 4.

FIG. 5A is a table of the possible combinations of selected pinions for engaging the gearsets shown in FIG. 5.

FIG. 5B is a table showing the gearsets and the associated degree of the common ratios in the geometric sequence of the gearsets in the two units shown in FIG. 5.

FIG. 6A is a table of the possible combinations of selected pinions for engaging the gearsets shown in FIG. 6.

FIG. 6B is a chart ratios of the gearsets in the three units shown in FIG. 6.

DESCRIPTION OF THE PREFERRED EMBODIMENTS

The gearboxes shown in the figures have pinions on clutches for engaging shafts and gears. The ratio of the diameters or numbers of teeth on pinions and gears determines the relative speeds of the shafts. All of the gears and pinions in the gearbox are related by degrees of a common ratio in a geometric progression. For example, if the common ratio is 1 to 1.20 then the common ratio of the first degree will be 1, a common ratio of the second degree will be 1 to 1.2, a common ratio of the third degree will be 1 to 1.44, a common ratio of the fourth degree will be 1 to 1.728, etc. The product of the number of gearsets in all the units (number of gearsets between pairs of shafts) equals the number of forward speeds or torques in the gearbox. Each unit has a fixed degree of common ratio difference between the gearsets of the unit. Each unit has a different degree in the geometric sequence from the other units. Each unit may have a gearset ratio of 1 such that the final output of the gearbox may be 1 to 1. One or more shafts may have one or more join gears. Shafts in the gearbox may have a split shaft with a clutch.

Figures 2, 2P:
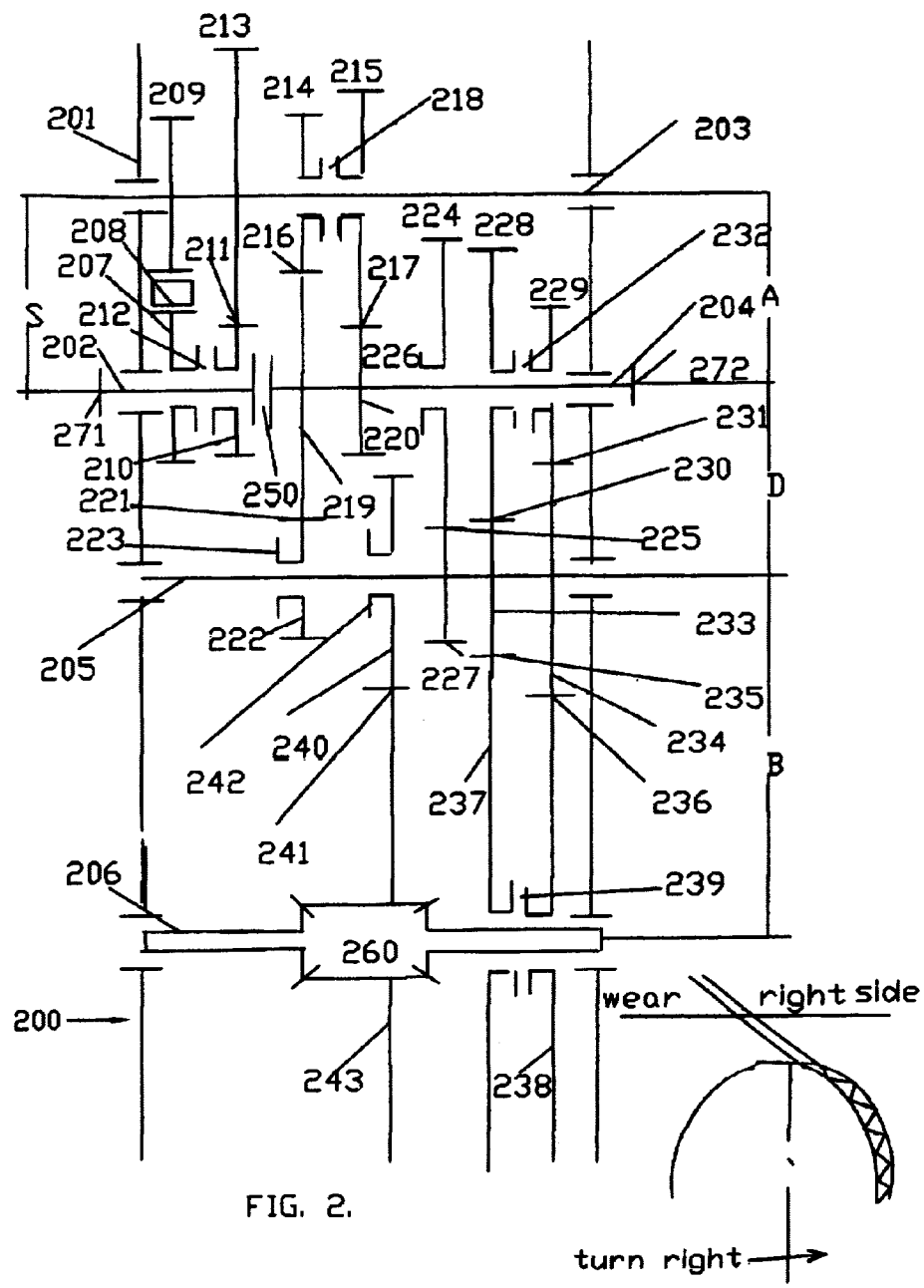
FIG. 2 is a schematic of a gearbox with 5 shafts and 4 units of gearsets therebetween with a 1, 2, 3, and 4 gearset per unit arrangement, wherein the use of a split shaft provides two shafts in the gearbox, to produce forward and reverse speeds.
FIG. 2P is a schematic showing the wear on the right side of gear tooth of the gears in FIG. 2.

In the embodiment shown there are generally 24 forward and 12 or 24 reverse gears available in gearboxes with 4 or 5 shafts and 6 reverse gears in gearbox with 3 shafts. A gearbox having split shaft with 5 shafts can produce 68 gears having 36 forward and 24 reverse gears, plus 2 forward and 2 reverse gears as a power take off. In the embodiment shown in FIG. 2.1 the same gearbox as shown in FIG. 2 is driven on the opposite side of the split shaft and the shaft has been turned over for use of the gears on the opposite side of the teeth to double the life of the gears in the gearbox. The gearbox in FIG. 2.1 has an addition 2 forward and 2 reverse gears for power take off compared to the gearbox in FIG. 2. The gearbox in FIG. 2.1 produces 24 forward gears as does the gearbox in FIG. 2.

For making the most efficient gearbox the gears in the gearsets should all be sized to be degrees of a common ratio in a geometric sequence and the ratio of torques to the number of gears and shafts should be maximized. In the embodiments shown herein there are between 17 and 25 gears on gearbox having between 3 and 5 shafts for an average ratio of torques to gears and shafts of 155%. Specifically, the torques (both forward and reverse) over gears plus shafts for the six embodiments shown in FIG. 1, 2, 3, 4, 5 and 6 are 36/(17+5), 48/(20+5), 36/(20+4), 30/(22+3), 48/(25+5) and 36/(21+4), respectively.

Figure 1:
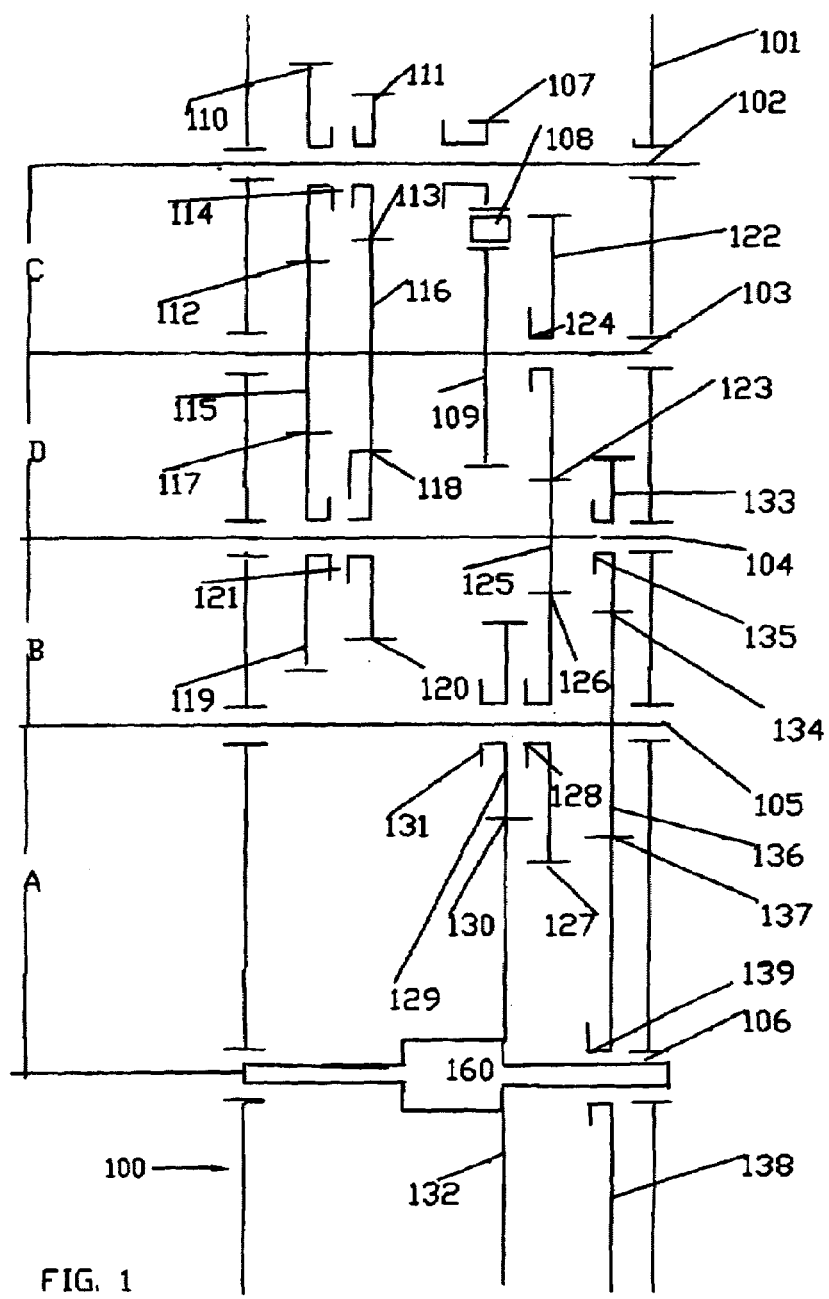
FIG. 1 is a schematic of a gearbox with 5 shafts having 4 units of gearsets therebetween with a 2, 2, 2, 3 gearset per unit arrangement.

In the first embodiment, shown in FIG. 1, there are 24 gears of forward and 12 reverse speeds available from gearbox 100. Gearbox 100 has frame members 101 supporting drive shaft 102, first intermediate shaft 103, second intermediate shaft 104, third intermediate shaft 105, and differential shaft 106 connected to differential 160.

Power may enter the gearbox 100 on the left side on outward end 171 of the drive shaft 102 or on opposite outward end 172 if the shaft 102 in gearbox 100 is turned over for using the opposed side of teeth on the gears. Power entering at outward end 171 enters double synchronizer clutch 114. Pinion 110 and pinion 111 are in double synchronizer clutch 114 and may be separately selected. When pinion 110 is selected it engages drive shaft 102, and engages and turns gear 115 on first intermediate shaft 103 to form gearset 112. Gearset 112 connects drive shaft 102 and the first intermediate shaft 103 such that the first intermediate shaft 103 turns at a rate depending on the ratio of the gears in the gearset 112. When pinion 111 is selected it engages drive shaft 102, and engages and turns gear 116 on intermediate shaft 103 to form gearset 113. The gearsets 112 and 113 between the drive shaft 102 and the first intermediate shaft 103 are unit C gearsets. Gearset 112 has ratio of 1 to 1 or zero degrees of difference in a geometric sequence. Gearset 113 has the ratio of $1/R^3$ or three degrees of difference in a geometric sequence.

Pinion 115 meshes with gear 119 to form gearset 117 having a ratio of 1 and turns second intermediate shaft 104 if gear 119 is selected in double synchronizer clutch 121.

Pinion 116 meshes with gear 120 to form gearset 118 having a ratio of $R^2$, where gear 120 is selected in double synchronizer clutch 121. The gearsets 117 and 118, between the first intermediate shaft 103 and second intermediate shaft 104, are unit D gearsets. Four gearsets 112, 113, 117 and 118 of the two units C and D have two join gears 115 and 116 on the first intermediate shaft 103. Gearset 118 has a ratio of $R^2$ and has a difference in value of R from gearset 113, which has a ratio of $1/R^3$. In the embodiment shown the teeth of pinion 118 were addendum shifted to make the teeth mesh properly.

When pinion 122 in single synchronizer clutch 124 is selected to engage first intermediate shaft 103 it turns second intermediate shaft 104 by meshing with gear 125 forming gearset 123 with a ratio of R. Gearsets 117, 118 and 123 are unit D gearsets. Pinion 125 on second intermediate shaft 104 also meshes with gear 127 forming gearset 126 having ratio $1/R^2$. When gear 127 in single synchronizer clutch 128 is selected, power is transmitted to third intermediate shaft 105 by pinion 125.

Second intermediate shaft 104 can also transmit power to third intermediate shaft 105 by use of single synchronizer clutch 135 having pinion 133 which meshes with gear 136 to form gearset 134 having a ratio $1/R^8$. Gearsets 126 and 134 are unit B gearsets.

Third intermediate shaft 105 has two ways to transmit power to the differential shaft 106. As the third intermediate shaft 105 is turned, it turns gear 136 engaging and turning differential shaft 106 by pinion 138 on single synchronizer clutch 139 when pinion 138 is selected and engages differential shaft 106 to form gearset 137 having a ratio of 1. Third intermediate shaft 105 can also transmit power to the differential shaft 106 by way of single synchronizer clutch 131 having pinion 129 which meshes with gear 132 to form gearset 130 with a ratio of $1/R^{12}$. Gearsets 130 and 137 are unit A gearsets.

A sliding reverse pinion 107 runs power from the drive shaft 102 to first intermediate shaft 103 by way of idler gear 108 and reverse gear 109. By design choice, as can be readily seen in FIG. 1, the reverse mechanism may have 9 different locations between the 5 shafts to provide 1, 2, 4, 6, 8, or 12 reverse gears.

When the various clutches in FIG. 1 are selected to operate the combinations of gears in the gearbox, twenty-four forward and twelve reverse speeds may be selected from in a 2, 2, 2, 3 pattern from unit A, B, C and D gearsets.

The table in FIG. 1A shows the combinations of pinions selected at the clutches to yield the twenty-four speeds. The speeds can be calculated from the ratios of the gears and pinions.

In the gearbox depicted in FIG. 1 there are 36 torques, 24 forward and 12 reverse, using 17 gears and 5 shafts for a torque to gears and shafts ratio of 36/(17+5)=1.64.

As shown in the table of FIG. 1B the combinations of gears yield one gearset from the two possibilities 1 or $1/R^{12}$ in unit A, one gearset from the two possibilities $1/R^2$ or $1/R^8$ in unit B, one gearset from the two possibilities 1 or $1/R^3$ in unit C and one gearset from the three possibilities 1, R or $R^2$ in unit D for a total of 24 forward gear combinations and 12 reverse gears.

There is a uniform separation in the degree of the common ratio of the gearsets in each unit. The degree of common ratios of separation is calculated based on the number of forward gears or torques in the gearbox divided by the number of gearsets in the unit. In gearbox 100 shown in FIG. 1 there are 4 units A, B, C and D with 2, 2, 2, and 3 gearsets respectively. The common ratio degree of separation in the geometric sequence of the unit A is 12 degrees since there are 2 gearsets in unit A and 24 forward gears, (24/2=12). Therefore the separation in the common ratio of the geometric sequence is of the $12^{th}$ degree in unit A. If one of the gearsets in unit A has a ratio of 1 the second gearset has ratio of $1/R^{12}$ or $R^{12}$. Here by design choice the gearsets have the ratios of 1 and $1/R^{12}$. Unit B has 2 gearsets with a separation of 6 degrees in the common ratio of the geometric sequence since there are remaining 12 combinations of gearsets that can be used and 2 gearsets in unit B, (12/2=6). If the first gearset in unit B has a ratio of $1/R^2$, then the second gearset has a ratio of $1/R^8$, which is a common ratio of 6 degrees different from the first gearset. The choice of $1/R^2$ and $1/R^8$ are a matter of design choice but the six degrees of separation is part of the gearbox formula. Since unit C has 2 gearsets with 6 remaining combinations of gearsets, out of the original 24 combinations, there are three degrees of separation in unit C (6/2=3). If the first gearset in unit C has a ratio in the geometric sequence of 1 by design choice, then the second gearset will have three degrees of separation such as $R^3$ or $1/R^3$. In gearbox 100 the ratio selected is $1/R^3$ by design choice. The remaining 3 gearsets have one degree of separation in the common ratio of the geometric sequence. In gearbox 100 the ratios selected in unit D are 1, R and $R^2$ by design choice. In order for the gearbox to have an input to output ratio of 1 to 1 the gearbox can have a gearset ratio selection in the units of $1 \times 1 \times 1/R^2 \times R^2 = 1$.

In the second embodiment, gearbox 200, as shown in FIG. 2 and FIG. 2.1 there are 36 gears of forward speeds and 24 reverse speeds. In addition, due to the split shaft (202, 204 connected by clutch 250), there can be 4 forward speeds and 4 reverse speeds available for a power take off on the split shaft.

Gearbox 200 has a frame member 201 supporting drive shaft 202, first intermediate shaft 203, second intermediate shaft 204, third intermediate shaft 205, and differential shaft 206 connected to differential 260. Drive shaft 202 is split with second intermediate shaft 204 with the shafts joined by synchronizer clutch 250.

Power can enter the gearbox 200 on the left side on outward end 271 of the drive shaft 202 or on opposed outward end 272 of the split second intermediate shaft 204. The second intermediate shaft 204 can be turned over as shown in FIG. 2.1 for using the opposed side of teeth on the gears as shown in FIG. 2P to extend the life of the gearbox particularly for the power take off feature of the addition of 4 gears.

Power entering the gearbox 200 at outward end 271 first enters double synchronizer clutch 212. Pinion 210 and reverse pinion 207 are in double synchronizer clutch 212 and may be separately selected. When pinion 210 is selected it engages drive shaft 202, and engages and turns gear 213 on first intermediate shaft 203 to form gearset 211 with a ratio of $1/R^8$. Gearset 211 connects drive shaft 202 and the first intermediate shaft 203 such that the first intermediate shaft 203 turns at a rate depending on the ratio of the gears in the gearset 211 which here is $1/R^8$. The gearset 211 between the drive shaft 202 and the first intermediate shaft 203 is a unit S gearset.

There are two possible ways to transmit power from the first intermediate shaft 203 to the second intermediate shaft 204. Pinions 214 and 215 are in double synchronizer clutch 218 and may be separately selected. When pinion 214 on first intermediate shaft 203 is selected, it engages and turns gear 219 on second intermediate shaft 204 to form gearset 216 with gearset ratio of $1/R^{12}$. Gearset 216 is between first intermediate shaft 203 and the second intermediate shaft 204 such that the second intermediate shaft 204 turns at a rate 1 to $R^{12}$. When pinion 215 on first intermediate shaft 203 is selected it engages and turns gear 220 on second intermediate shaft 204 to form gearset 217 with a gearset ratio of 1. Gearset 217 is between first intermediate shaft 203 and the second intermediate shaft 204 such that the second intermediate shaft 204 turns at a rate 1 compared to first intermediate shaft 203. Gearsets 216 and 217 between the first intermediate shaft 203 and the second intermediate shaft 204 are unit A gearsets.

There are four possible ways to transmit power from the second intermediate shaft 204 to the third intermediate shaft 205. As the second intermediate shaft 204 is turned it turns gear 219 engaging and turning third intermediate shaft 205 by pinion 222 on single synchronizer clutch 223. When pinion 222 is selected it engages third intermediate shaft 205 to form gearset 221 with ratio of $R^7$. Gearset 221 connects the second intermediate shaft 204 such that the third intermediate shaft 205 turns at a rate of 1 to $R^7$.

When pinion 224 in single synchronizer clutch 226 is selected it engages second intermediate shaft 204 and turns third intermediate shaft 205 by meshing with gear 227 forming gearset 225 with a ratio of $R^6$. Gearset 225 is between the second intermediate shaft 204 and the third intermediate shaft 205 such that the third intermediate shaft 205 turns at a rate of $R^6$ compared to second intermediate shaft 204.

Pinion 228 and pinion 229 are in double synchronizer clutch 232 and may be separately selected. When pinion 228 in double synchronizer clutch 232 is selected to engage second intermediate shaft 204 it turns third intermediate shaft 205 by meshing with join gear 233 forming gearset 230 with a ratio of $R^8$. Gearset 230 is between second intermediate shaft 204 and third intermediate shaft 205 such that the third intermediate shaft 205 turns at a rate of $R^8$ compared to second intermediate shaft 204.

When pinion 229 in double synchronizer clutch 232 is selected to engage second intermediate shaft 204 it turns third intermediate shaft 205 by meshing with gear 234 forming gearset 231 with a ratio of $R^5$. Gearset 231 is between second intermediate shaft 204 and third intermediate shaft 205 such that the third intermediate shaft 205 turns at a rate of $R^5$ compared to second intermediate shaft 204.

The gearsets 221, 225, 230 and 231 between the second intermediate shaft 204 third intermediate shaft 205 are unit D gearsets.

There are three possible ways to transmit power from the third intermediate shaft 205 to the differential shaft 206. Pinion 237 and pinion 238 are in double synchronizer clutch 239 and may be separately selected. As a third intermediate shaft 205 is turned it turns join gear 233 engaging and turning differential shaft 206 by pinion 237 on double synchronizer clutch 239 when pinion 237 is selected and engages differential shaft 206 to form gearset 235 with a ratio of $1/R^8$. Gearset 235 connects the third intermediate shaft 205 to the differential shaft 206 such that it turns at a rate of 1 to $1/R^8$. As second intermediate shaft 204 is turned it turns join gear 234 engaging and turning third intermediate shaft 205 by pinion 238 on double synchronizer clutch 239 when pinion 238 is selected and engages differential shaft 206 to form gearset 236 with a ratio of $1/R^4$. Gearset 236 connects the third intermediate shaft 205 such that the differential shaft 206 turns at a rate of 1 to $R^4$ compared to third intermediate shaft 205.

Four gearsets 230, 231, 235 and 236 of the two units B and D have two join gears 233 and 234 on the third intermediate shaft 205. For spacing of the shaft, purposed gearset 236 with a ratio of $1/R^4$ is pared with gearset 236 with a ratio of $R^5$ and gearset 230 with a ratio of $R^8$ and gearset 235 with a ratio of $1/R^8$ are paired. By design choice the teeth of pinion 238 were addendum modification shifted to mesh with the teeth on join gear 234.

When pinion 240 in single synchronizer clutch 242 is selected to engage third intermediate shaft 205 it turns differential shaft 206 by meshing with gear 243 forming gearset 241 with a ratio of 1. Gearset 241 is between third intermediate shaft 205 and the differential shaft 206 such that the differential shaft 206 turns at a rate 1 to 1 compared to third intermediate shaft 205.

The gearsets 235, 236 and 241 between the third intermediate shaft 205 and differential shaft 206 are unit B gearsets.

A reverse pinion 207 is in double synchronizer clutch 212. When reverse pinion 207 is selected it engages drive shaft 202, and engages and turns idle gear 208 and reverse gear 209 on first intermediate shaft 203. As can be seen in FIG. 2 the reverse mechanism may have 5 locations between 5 shafts where one shaft is split to provide 1, 3, 6, 8 or 12 reverse gears.

When the various clutches are selected to operate the various combinations of gears in gearbox 200, twenty-four forward and twenty-four reverse speeds, as shown in FIG. 2A, may be selected from in a 1, 2, 3, 4 pattern of gearsets in unit S, A, B, and D respectively as shown in FIG. 2B.

Alternatively, second intermediate shaft 204 can receive power by engaging synchronizer clutch 250 on the split shaft when power is connected to outward end 271 of drive shaft 202 or by directly connecting second intermediate shaft 204 to the power source at outward end 272. The power then flows through the gearbox 200 from second intermediate shaft 204 to third intermediate shaft 205 to the differential shaft 206 by use of the 4 gearsets in unit D and the 3 gearsets of unit B operated as described above. The ratios of the gearsets are shown in FIG. 2D which is a subset of the gearsets of FIG. 2B. The output gear ratios are the combinations of the ratios in Unit B and Unit D which will produce ratios $R^8$, $R^7$, $R^6$, $R^5$, $R^4$, $R^3$, $R^2$, $R$, 1, $1/R$, $1/R^2$ and $1/R^3$ which overlap some of the results which can be obtained by using units A, B, D and S. The overlapping resultant ratios are 1, $1/R$, $1/R^2$ and $1/R^3$ obtained by the use of gearset 211 with a ratio of $1/R12^8$ of unit S applied to the unit B and unit D results, so there are two ways to obtain these gear ratios using gearbox 200.

FIG. 2.1 shows a variation of FIG. 2 with the shafts turned around such that the other side of the gear teeth are used as shown in FIG. 2.1P. Power enters the gearbox 200 from outward end 272 on split second intermediate shaft 204 and can be transferred to first intermediate shaft 203 then to split drive shaft 202 by use of pinions 219 and 220 meshed to gears 214 and 215 in double synchronizer clutch 218 which may be separately selected. As a second intermediate shaft 204 is turned, it turns pinion 220 engaging and turning first intermediate shaft 203 by gear 215 on double synchronizer clutch 218 when pinion 220 is selected and engages first intermediate shaft 203 to form gearset 217 with ratio of 1. Gearset 217 connects the second intermediate shaft 204 such that the first intermediate shaft 203 turns at a rate of 1 to 1. As a second intermediate shaft 204 is turned, it turns pinion 219 engaging and turning first intermediate shaft 203 by gear 214 on double synchronizer clutch 218 when gear 214 is selected and engages first intermediate shaft 203 to form gearset 216 with a ratio of $R^{12}$. Gearset 216 connects the second intermediate shaft 204 such that the first intermediate shaft 203 turns at a rate of 1 to $R^{12}$.

The gearsets 216 and 217 between the drive shaft 202 and the first intermediate shaft 203 are unit A1 gearsets.

As a first intermediate shaft 203 is turned it turns pinion 213 engaging and turning drive shaft 202 by gear 210 on double synchronizer clutch 212 when gear 210 is selected and engages drive shaft 202 to form gearset 211 with ratio of $R^8$. Gearset 211 connects the first intermediate shaft 203 to drive shaft 202 such that drive shaft 202 turns at a rate of 1 to $R^8$. The gearset 211 between first intermediate shaft 203 and drive shaft 202 is a unit S1 gearset.

As first intermediate shaft 203 is turned, it turns reverse pinion 209 engaging and turning the idle gear 208 for engaging and turning drive shaft 202 when gear 207 on double synchronizer clutch 212 is selected and engages drive shaft 202.

The split drive shaft 202 with 2 forward gears (ratios are $R^{12}$ and $R^{24}$) and 2 reverse gears may used as a power take off at outward end 271.

The tables in FIG. 2A, FIG. 2C, FIG. 2E show the combinations of pinions selected at the clutches to yield the thirty eight forward and twenty-six reverse speeds for output of the gearbox at the differential and for the power take off. The speeds can be calculated from the combinations of degrees of ratios of the gears and pinions.

There are 68 torques of 36 forward and 24 reverse for movement and 4 forward and 4 reverse speeds for working organ on 17 gears and 5 shafts for a torque to gears and shafts ratio of 68/(17+5)=3.09.

As shown the table in FIG. 2B, the combinations of gears yield two ratios of gearsets from the two possibilities 1 and $1/R^{12}$ in unit A, three ratios of gearsets from the three possibilities $1/R^4$, $1/R^8$ and 1 in unit B, four ratios of gearsets from the four possibilities $R^5$, $R^6$, $R^7$ and $R^8$ in unit D one ratio of gearset $1/R^8$ unit S for a total of 24 forward gear combinations and 24 reverse gears.

As shown the table in FIG. 2D, the combinations of gears yield three ratios of gearsets from three possibilities $1/R^8$, , $1/R^4$ and 1 in unit B, four ratios of gearsets from the of four possibilities $R^5$, $R^6$, $R^7$ and $R^8$ in unit D for a total of 12 forward gear combinations.

As shown the table in FIG. 2F, the combinations of gears yield two ratios of gearsets from the of two possibilities 1 and $1/R^{12}$ in unit A, and one ratio in gearset $1/R^8$ unit S for a total of 2 forward gear combinations and 2 reverse gears.

The table in FIG. 2.1A, FIG. 2.1E shows the combinations of pinions selected at the clutches to yield the twelve forward for movement and two forward and two reverse speeds for a power take off. The speeds can be calculated from the combinations of degrees of common ratios of the gears and pinions.

As shown the table in FIG. 2.1F, the combinations of gears yield two ratios of gearsets from the of two possibilities 1 and $R^8$ in unit A1, and one ratio $1/R^8$ for the gearset in unit S1 for a total of 2 forward gear combinations and 2 reverse gears.

In FIG. 2 the degree of common ratio in the geometric sequence for the 1×2×3×4 gearbox of units S, A, B and D respectively having 24 forward gears, is 12 degrees for unit A, since there a 2 gearsets in unit A and 24 in all. 24/2=12, therefore the common ratio of gearsets in unit A has a ratio of $12^{th}$ degree. If the first gearset is selected by design choice to have a ratio of 1 the second gearset will have 12 degrees of separation and has a ratio of $1/R^{12}$. There are 12 combinations of gearsets remaining. Unit B has three gearsets. 12/3=4, therefore the gearsets in unit B differ by four degrees of common ratio in the geometric sequence. Therefore, the degrees of common ratio by design choice can be $1/R^8$, $1/R^4$ and 1. In unit D there are four gearsets to choose from for one degree of common ratio in the geometric sequence between gearsets ratios. The degrees of common ratio by design choice can be $R^8$, $R^7$, $R^6$ and $R^5$. Therefore fixed gearset of unit S may have ratio of $1/R^8$, which is selected by design choice to provide the gearbox with the desired output torques. In order to have a 1 to 1 input to output ratio from the gearbox the gearset choices of $1\times1\times1/R^8 \times R^8 = 1$ can be made.

Figure 3:
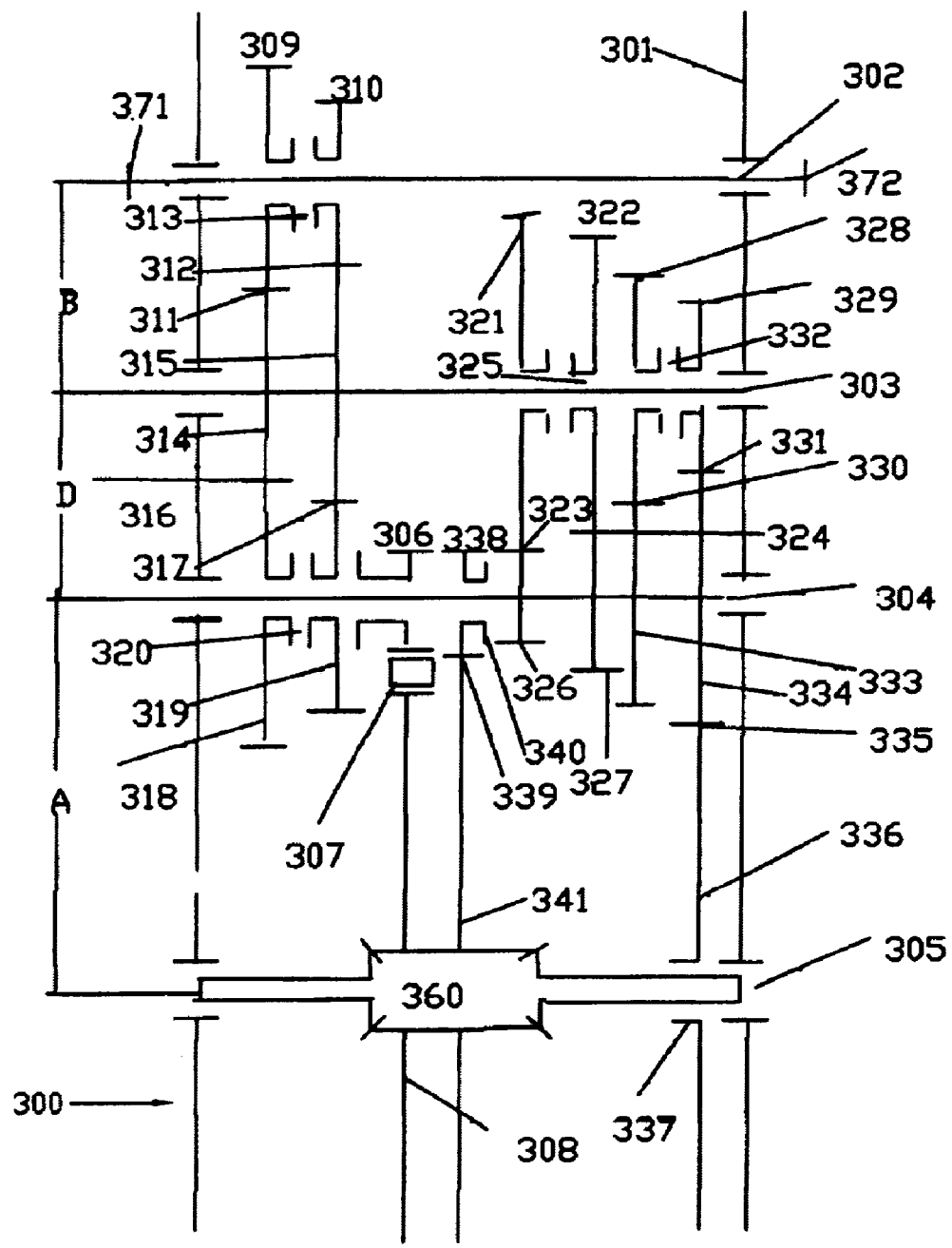
FIG. 3 is a schematic of a gearbox with 4 shafts with 3 units of gearsets therebetween having 2, 2, and 6 gearsets respectively in the units.

In a third embodiment shown in FIG. 3 there are 24 gears of forward and 12 reverse speeds available from gearbox 300. Gearbox 300 has frame members 301 supporting drive shaft 302, first intermediate shaft 303, second intermediate shaft 304, and differential shaft 305 connected to differential 360.

Power enters to left side of the gearbox 300 on outward end 371 of the drive shaft 302 or on opposed outward end 372 if the shaft is turned over for using the opposed side of teeth. The drive shaft 302 passes through double synchronizer clutch 313. Pinion 309 and pinion 310 are in double synchronizer clutch 313 and may be separately selected. When pinion 309 is selected it engages drive shaft 302, and engages and turns join gear 314 on first intermediate shaft 303 to form gearset 311 with a ratio of 1. Gearset 311 connects drive shaft 302 and first intermediate shaft 303 such that the first intermediate shaft 303 turns at a rate depending on the ratio of the gears in the gearset 311. When pinion 310 is selected it engages drive shaft 302, and engages and turns join gear 315 on first intermediate shaft 303 to form gearset 312 with a ratio of $1/R^6$. Gearset 312 is between drive shaft 302 and first intermediate shaft 303 such that the first intermediate shaft 303 turns at a rate of 1 to $R^6$. The gearsets 311 and 312 between the drive shaft 302 and the first intermediate shaft 303 are unit B gearsets.

When pinion 321 in double synchronizer clutch 325 is selected to engage first intermediate shaft 303 it turns second intermediate shaft 304 by meshing with gear 326 forming gearset 323 with a ratio of $R^4$. Gearset 323 is between first intermediate shaft 303 and second intermediate shaft 304 such that the second intermediate shaft 304 turns at a rate of 1 to $R^4$ relative to the first intermediate shaft 303. When pinion 322 in double synchronizer clutch 325 is selected to engage first intermediate shaft 303 it turns second intermediate shaft 304 by meshing with gear 327 forming gearset 324 with a ratio of $R^3$. Gearset 324 is between first intermediate shaft 303 and second intermediate shaft 304 such that the second intermediate shaft 304 turns at a rate 1 to $R^3$ relative to first intermediate shaft 303.

When pinion 328 in double synchronizer clutch 332 is selected it engages first intermediate shaft 303, and engages and turns gear 333 on second intermediate shaft 304 to form gearset 330 with a ratio of $R^2$. Gearset 330 connects first intermediate shaft 303 and second intermediate shaft 304 such that the second intermediate shaft 304 turns at a rate of 1 to $R^2$ relative to first intermediate shaft 303. When pinion 329 in double synchronizer clutch 332 is selected it engages first intermediate shaft 303, and engages and turns gear 334 on second intermediate shaft 304 to form gearset 331 with a ratio of 1 to R. Gearset 331 connects first intermediate shaft 303 and second intermediate shaft 304 such that the second intermediate shaft 304 turns at a rate 1 to R relative to first intermediate shaft 303.

When gear 318 is selected it engages second intermediate shaft 304, and engages and is turned by join pinion 314 on first intermediate shaft 303 to form gearset 316 with a ratio of 1 to 1. Gearset 316 connects first intermediate shaft 303 and second intermediate shaft 304 such that second intermediate shaft 304 turns at a rate 1 to 1 relative to first intermediate shaft 303.

When gear 319 is selected it engages second intermediate shaft 304, and engages and is turned by join pinion 315 on first intermediate shaft 303 to form gearset 317 with a ratio of $R^5$. Gearset 317 connects first intermediate shaft 303 and second intermediate shaft 304 such that second intermediate shaft 304 turns at rate 1 to $R^5$ relative to first intermediate shaft 303.

Gearset 316, 317, 323, 324, 330, 331 are unit D gearsets. Gearsets 311, 312, 316 and 317 of units B and D have join gears 315 and 316 on the first intermediate shaft 303. Gearset 317 has a ratio of $R^5$ and different by geometric ratio R from inverse ratio of $1/R^6$ of gearset 312 By design choice, teeth of pinion 319 are addendum shifted to adjust for the difference of the common ratio R between the two gearsets. Similarly the size $R^5$ of gearset 317 is different than the size of ratio $1/R^6$ of gearset 312 of unit B by the geometric ratio R when it is installed with join gear 315. For installing both gearsets together, it id necessary to do use addendum shifting the teeth in pinion 319.

When pinion 338 in synchronizer clutch 340 is selected it engages second intermediate shaft 304, and engages and turns gear 341 on differential shaft 305 to form gearset 339 with a ratio of $1/R^{17}$. Gearset 339 connects second intermediate shaft 304 and the differential shaft 305 such that the differential shaft 305 turns at a rate 1 to $1/R^{17}$ compared to second intermediate shaft 304. As second intermediate shaft 304 is turned it turns join pinion 334 forming gearset 335 with a ratio of $1/R^5$. Join pinion 334 also engages and turns gear 336 in single synchronizer clutch 337 on differential shaft 305. Gearset 335 connects second intermediate shaft 304 and the differential shaft 305 such that the differential shaft 305 turns at a rate 1 to $1/R^5$ compared to second intermediate shaft 304. Gearset 335 and 339 are unit A gearsets.

The differential shaft 305 may be run in reverse by engaging reverse pinion 306, which connects to idler gear 307 and reverse gear 308 on differential 360. As can be seen in FIG. 3, the reverse mechanism may have 5 different locations between the 4 shafts, where one shaft is split, providing 1, 2, 4, or 12 reverse gears.

When the various clutches are selected to operate the various combinations of gears in gearbox 300, twenty-four forward and twelve reverse speeds may be selected from in a 2, 2, 6 pattern using gearsets in unit A, B, and D respectively.

The table in FIG. 3A shows the combinations of pinions selected at the clutches to yield the twenty-four forward and twelve reverse speeds. The speeds can be calculated from the combinations of degrees of common ratios of the gears and pinions.

There are 36 torques, 24 forward and 12 reverse on 20 gears and 4 shafts for a torque to gears and shafts ratio of 36/(20+4)=1.5.

As shown the table in FIG. 3B the combinations of gears yield two ratios of gearsets from the two possibilities $1/R^5$ and $1/R^{17}$ in unit A, two ratios of gearsets from the two possibilities $1/R^6$ and 1 in unit B, six ratios of gearsets from the six possibilities 1, R, $R^2$, $R^3$, $R^4$ and $R^5$ in unit D for a total of 24 forward gear combinations and 12 reverse gears.

In FIG. 3B the degree of separation between the ratios in the gearsets for the ratio in the geometric sequence in the 2×2×6 gearbox having 24 gears, is 12 for unit A. Since there are 2 gearsets in unit A and 24 in all, 24/2=12, therefore the difference in the a common ratio is of the $12^{th}$ degree in unit A. If the first gearset is selected by design choice to have a ratio of $1/R^5$ the second gearset will have 12 degrees of separation and has a ratio of $1/R^{17}$. There are 12 combinations of gearsets remaining. Unit B has two gearsets, 12/2=6. Therefore the gearsets in unit B differ by six degrees of common ratio in the geometric sequence. Therefore the degrees of common ratio by design choice can be $1/R^6$ and 1. In unit D are six gearsets and 6 remaining gears from the original 24 to choose from for a one degree of common ratio in the geometric sequence between gearsets. The degrees of common ratio by design choice can be 1, R, $R^2$, $R^3$, $R^4$, $R^5$ in unit D. To obtain a 1 to 1 input to output in the gearbox the gearsets having rations of $1 \times 1/R^5 \times R^5 = 1$ may be selected.

Figure 4:
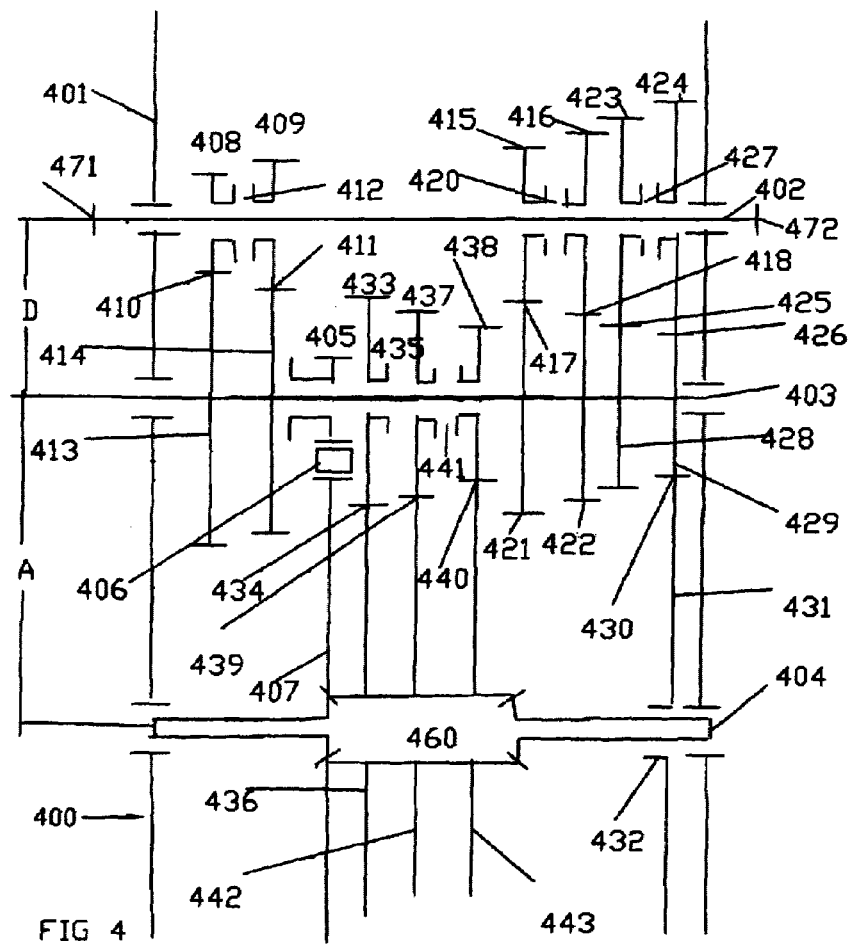
FIG. 4 is a schematic of a gearbox with 3 shafts and 2 units of gearsets therebetween having 4, 6 gearsets respectively in the units.

In the fourth embodiment shown in FIG. 4 there are 24 gears of forward and 6 reverse speeds available from gearbox 400. Gearbox 400 has frame members 401 supporting drive shaft 402, intermediate shaft 403 and differential shaft 404 connected to differential 460.

Power enters to left side of the gearbox 400 on outward end 471 of the drive shaft 402 or on opposed outward end 472 if the shafts are reversed for using the opposite side of the gear teeth. The drive shaft 402 passes through double synchronizer clutches 412, 420 and 427. Pinion 408 and pinion 409 are in double synchronizer clutch 412 and may be separately selected. When pinion 408 is selected it engages drive shaft 402, and engages and turns join gear 413 on intermediate shaft 403 to form gearset 410 with ratio of 1 to $1/R^{11}$. Gearset 410 connects drive shaft 402 and the intermediate shaft 403 such that the first intermediate shaft 403 turns at a rate depending on the ratio of the gears in the gearset 410. When pinion 409 is selected it engages drive shaft 402, and engages and turns join gear 414 on intermediate shaft 403 to form gearset 411 with ratio of 1 to $1/R^{10}$. Gearset 411 is between drive shaft 402 and first intermediate shaft 403 such that the intermediate shaft 403 turns at a rate 1 to $1/R^{10}$.

Pinion 415 and pinion 416 are in double synchronizer clutch 420 and may be separately selected. When pinion 415 is selected it engages drive shaft 402, and engages and turns join gear 421 on intermediate shaft 403 to form gearset 417 with a ratio of 1 to $1/R^9$. Gearset 417 connects drive shaft 402 and the intermediate shaft 403 such that the first intermediate shaft 403 turns at a rate depending on the ratio of the gears in the gearset 417. When pinion 416 is selected it engages drive shaft 402, and engages and turns join gear 422 on intermediate shaft 403 to form gearset 418 with a ratio of 1 to $1/R^8$. Gearset 418 is between drive shaft 402 and first intermediate shaft 403 such that the intermediate shaft 403 turns at a rate 1 to $1/R^8$.

Pinion 423 and pinion 424 are in double synchronizer clutch 427 and may be separately selected. When pinion 423 is selected it engages drive shaft 402, and engages and turns gear 428 on intermediate shaft 403 to form gearset 425 with a ratio of 1 to $1/R^7$. Gearset 425 connects drive shaft 402 and the intermediate shaft 403 such that the intermediate shaft 403 turns at a rate depending on the ratio of the gears in the gearset 425. When pinion 424 is selected it engages drive shaft 402, and engages and turns join gear 429 on intermediate shaft 403 to form gearset 426 with ratio of $1/R^6$. Gearset 426 is between drive shaft 402 and first intermediate shaft 403 such that the intermediate shaft 403 turns at a rate of 1 to $1/R^6$. Gearsets 410, 411, 417, 418, 425 and 426 between the drive shaft 402 and the first intermediate shaft 403 are unit D gearsets.

When pinion 437 in double synchronizer clutch 441 is selected to engage intermediate shaft 403 it turns differential shaft 404 by meshing with gear 442 on the differential 460 to form gearset 439 having a ratio of 1 to $R^6$. Gearset 439 is between intermediate shaft 403 and differential shaft 404 such that the differential shaft 404 turns at a rate 1 to $R^6$ relative to the intermediate shaft 403. When pinion 438 in double synchronizer clutch 441 is selected to engage intermediate shaft 403 it turns the differential shaft 404 by meshing with gear 443 on the differential 460 to form gearset 440 with a ratio of 1 to $1/R^{12}$. Gearset 440 is between intermediate shaft 403 and the differential shaft 404 such that the differential shaft 404 turns at a rate of 1 to $1/R^{12}$ compared to intermediate shaft 403.

When pinion 433 in single synchronizer clutch 435 is selected it engages intermediate shaft 403, and engages and turns gear 436 on the differential 460 to form gearset 434 with a ratio of 1 to 1. Gearset 434 connects intermediate shaft 403 and differential shaft 404 such that the differential shaft 404 turns at a rate 1 to 1 relative to intermediate shaft 403. As intermediate shaft 403 is turned it turns pinion 429 engaging and turning differential shaft 404 by gear 431 on single synchronizer clutch 432 when gear 431 is selected and differential shaft 404 to form gearset 430 with ratio of 1 to $R^6$. Gearset 430 connects intermediate shaft 403 and differential shaft 404 such that the differential shaft 404 turns at a rate 1 to $R^6$ compared to intermediate shaft 403.

Gearset 430. 434, 439 and 440 are unit A gearsets.

The differential shaft 404 may be run in reverse by engaging reverse pinion 405, which connects to idler gear 406 and reverse gear 407 on differential 460. As can be seen in FIG. 4 the reverse mechanism may have 2 locations between 3 shafts to provide 1, 4 or 6 reverse gears.

When the various clutches are selected to operate the various combinations of gears in gearbox 400, twenty-four forward and six reverse speeds may be selected from in a 4, 6 pattern from unit A, and D gearsets.

The table in FIG. 4A shows the combinations of pinions selected at the clutches to yield the twenty-four forward and six reverse speeds. The speeds can be calculated from the combinations of degrees of ratios of the gears and pinions.

There are 30 torques, 24 forward and 6 reverse on 22 gears and 3 shafts for a torque to gears and shafts ratio of 30/(22+3)=1.2.

As shown the table in FIG. 4B the combinations of gears yield four ratios of gearsets from the of four possibilities $R^6$, 1, $1/R^6$ and $1/R^{12}$ in unit A, six ratios of gearsets from the of six possibilities $1/R^6$, $1/R^7$, $1/R^8$, $1/R^9$, $1/R^{10}$ and $1/R^{11}$ in unit D for a total of 24 forward gear combinations and 6 reverse gears.

In FIG. 4B the degree of separation for the ratio in the geometric sequence for the 4×6 gearbox having 24 gears, is 6 for unit A, since there a 4 gearsets in unit A and 24 in all, 24/4=6. Therefore the ratios of gearsets in unit A have a separation in the common ratio of $6^{th}$ degree. If the first gearset is selected by design choice to have a ratio of $R^6$, the second gearset will have 6 degrees of separation and have a ratio of 1, the third gearset will have 6 degrees of separation and have a ratio of $1/R^6$, and the fourth gearset will have 6 degrees of separation and have a ratio of $1/R^{12}$. There are 6 combinations of gearsets remaining. Unit D has six gearsets. 6/6=1. Therefore the gearsets in unit D differ by one degree of common ratio in the geometric sequence. In unit D are six gearsets and 6 remaining gears from the original 24 to choose from for a one degree of common ratio in the geometric sequence between ratios of gearsets. Therefore the degrees of common ratio by design choice can be $1/R^6$, $1/R^7$, $1/R^8$, $1/R^9$, $1/R^{10}$ and $1/R^{11}$. To provide a gearbox with a 1 to 1 input to output gearsets can be chosen having values $1/R^6 \times R^6 = 1$.

Figure 5:
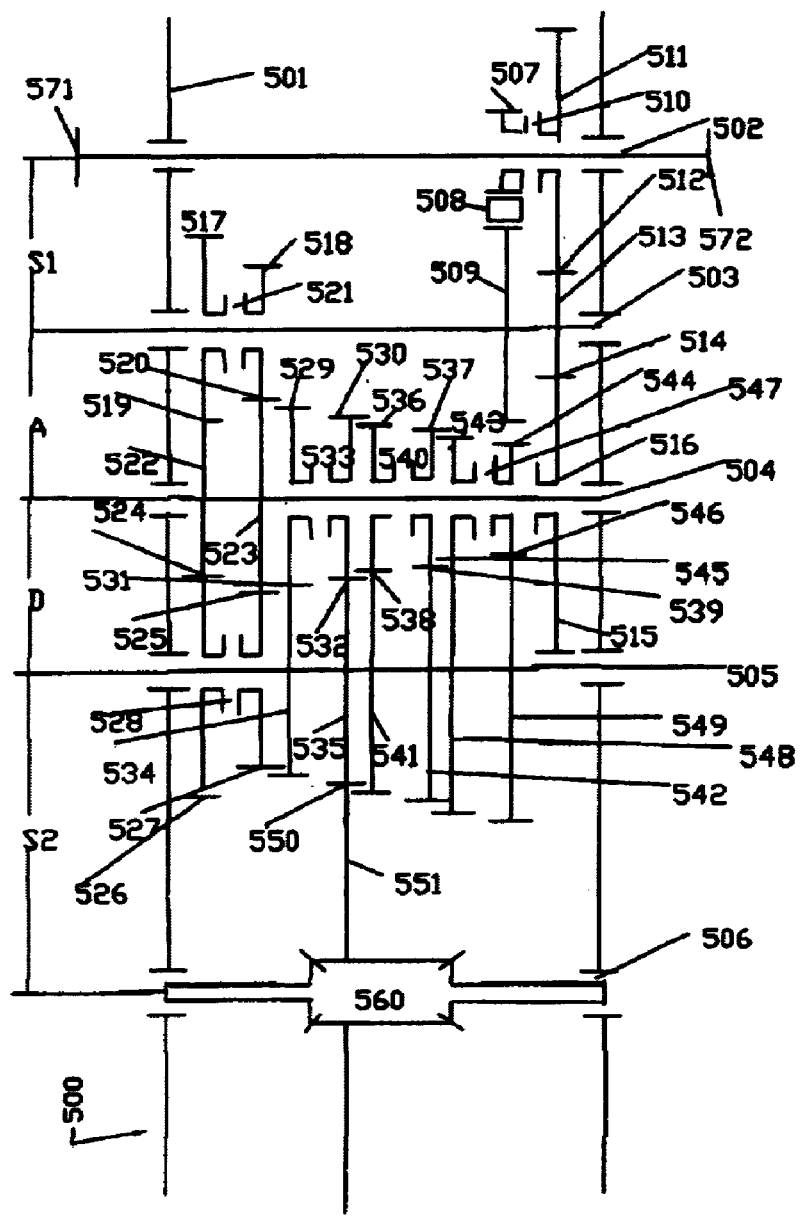
FIG. 5 is a schematic of a gearbox with 5 shafts and 4 units of gearsets therebetween having 1, 1, 3, and 8 gearsets respectively in the units.

In the fifth embodiment, shown in FIG. 5, gearbox 500 has 24 gears of forward and 24 reverse speeds available. Gearbox 500 has a frame members 501 supporting drive shaft 502, first intermediate shaft 503, second intermediate shaft 504, third intermediate shaft 505, and differential shaft 506 connected to differential 560.

Power enters the left side of gearbox 500 on outward end 571 of the drive shaft 502 or on opposite outward end 572 if the shafts are reversed for using the opposite side of the gears teeth. Drive shaft 502 passes through double synchronizer clutch 510. Pinion 511 and reverse pinion 507 are in double synchronizer clutch 510 and may be separately selected. When pinion 511 is selected it engages drive shaft 502, and engages and turns gear 513 on first intermediate shaft 503 to form gearset 512 with ratio 1 to $R^3$. Gearset 512 connects drive shaft 502 and the first intermediate shaft 503 such that the first intermediate shaft 503 turns at a rate depending on the ratio of the gears in the gearset 512. When reverse pinion 507 is selected it engages drive shaft 502, and engages and turns idle gear 508 and reverse gear 509 on intermediate shaft 503.

The gearset 512 between the drive shaft 502 and the first intermediate shaft 503 is a unit S1 gearset.

There are three possible ways to transmit power from the first intermediate shaft 503 to the second intermediate shaft 504. As first intermediate shaft 503 is turned it turns join pinion 513 engaging and turning second intermediate shaft 504 by gear 515 on single synchronizer clutch 516 when gear 515 is selected and engages second intermediate shaft 505 to form gearset 514 with a ratio of 1 to $1/R^8$. Gearset 514 connects the first intermediate shaft 503 such that the second intermediate shaft 504 turns at a rate of 1 to $1/R^8$. Pinions 517 and 518 are in double synchronizer clutch 521 and may be separately selected. When pinion 517 on first intermediate shaft 503 is selected, it engages and turns join gear 522 on second intermediate shaft 504 to form gearset 519 with ratio of $R^8$. Gearset 519 is between first intermediate shaft 503 and the second intermediate shaft 504 such that the second intermediate shaft 504 turns at a rate depending on the ratio of the gears in the gearset 519. When pinion 518 on first intermediate shaft 503 is selected, it engages and turns gear 523 on second intermediate shaft 504 to form gearset 520 with ratio of 1 to 1. Gearset 520 is between first intermediate shaft 503 and the second intermediate shaft 504 such that the second intermediate shaft 504 turns at a rate 1 to 1 compared to first intermediate shaft 503.

Gearsets 519, 520 and 514 between the first intermediate shaft 503 and the second intermediate shaft 504 are unit A gearsets.

There are eight possible ways to transmit power from the second intermediate shaft 504 to the third intermediate shaft 505. Gear 526 and gear 527 are in double synchronizer clutch 528 and may be separately selected. As a second intermediate shaft 504 is turned it turns join pinion 522 engaging and turning third intermediate shaft 505 by gear 526 on double synchronizer clutch 528. When gear 526 is selected it engages third intermediate shaft 505 to form gearset 524 with ratio of $1/R^8$. Gearset 524 connects the second intermediate shaft 504 such that the third intermediate shaft 505 turns at a rate of 1 to $1/R^8$. As a second intermediate shaft 504 is turned it turns join pinion 523, which engages and turns second intermediate shaft 504 by gear 527 on double synchronizer clutch 528 when gear 527 is selected and engages third intermediate shaft 505 to form gearset 525 with ratio of $1/R$. Gearset 525 connects the second intermediate shaft 504 such that the third intermediate shaft 505 turns at a rate of 1 to $1/R$ compared to second intermediate shaft 504.

Four gearsets 519, 520, 524 and 525 of the two units A and D have two join gears 522 and 523 on the second intermediate shaft 504. Gearset 520 with a ratio of 1 is different by geometric ratio R from ratio of 1/R of gearset 525. By design choice, teeth of pinion 527 were addendum modification shifted to make the gear teeth mesh due to the difference in gear size.

Pinions 529 and 530 are in double synchronizer clutch 533 and may be separately selected. When pinion 529 in double synchronizer clutch 533 is selected to engage second intermediate shaft 504 it turns third intermediate shaft 505 by meshing with join gear 534 forming gearset 531 with a ratio of 1 to $1/R^2$. Gearset 531 is between second intermediate shaft 504 and third intermediate shaft 505 such that the third intermediate shaft 505 turns at a rate 1 to $1/R^2$ compared to first intermediate shaft 503.

When pinion 530 in double synchronizer clutch 533 is selected to engage second intermediate shaft 504 it turns third intermediate shaft 505 by meshing with join gear 535 forming gearset 532 with a ratio of 1 to $1/R^3$. Gearset 532 is between second intermediate shaft 504 and third intermediate shaft 505 such that the third intermediate shaft 505 turns at a rate 1 to $1/R^3$ compared to second intermediate shaft 503.

Pinions 536 and 537 are in double synchronizer clutch 540 and may be separately selected. When pinion 536 in double synchronizer clutch 540 is selected to engage second intermediate shaft 504 it turns third intermediate shaft 505 by meshing with gear 541 forming gearset 538 with a ratio of 1 to $1/R^4$. Gearset 538 is between second intermediate shaft 504 and the third intermediate shaft 505 such that the third intermediate shaft 505 turns at a rate 1 to $1/R^4$ compared to second intermediate shaft 504.

When pinion 537 in double synchronizer clutch 540 is selected to engage second intermediate shaft 504 it turns third intermediate shaft 505 by meshing with join gear 542 forming gearset 539 with a ratio of $1/R^5$. Gearset 539 is between second intermediate shaft 504 and third intermediate shaft 505 such that the third intermediate shaft 505 turns at a rate 1 to $1/R^5$ compared to second intermediate shaft 503.

Pinions 543 and 544 are in double synchronizer clutch 547 and may be separately selected. When pinion 543 in double synchronizer clutch 547 is selected to engage second intermediate shaft 504 it turns third intermediate shaft 505 by meshing with gear 548 forming gearset 545 with a ratio of $1/R^6$. Gearset 545 is between second intermediate shaft 504 and third intermediate shaft 505 such that the third intermediate shaft 505 turns at a rate 1 to $1/R^6$ compared to second intermediate shaft 503.

When pinion 544 in double synchronizer clutch 540 is selected to engage second intermediate shaft 504 it turns third intermediate shaft 505 by meshing with gear 549 forming gearset 546 with a ratio of $1/R^7$. Gearset 546 is between second intermediate shaft 504 and the third intermediate shaft 505 such that the third intermediate shaft 505 turns at a rate 1 to $1/R^7$ compared to second intermediate shaft 503.

The gearsets 524, 525, 531, 532, 538, 539, 545 and 546 between the second intermediate shaft 504 and the third intermediate shaft 505 are unit D gearsets.

As third intermediate shaft 505 is turned it turns join gear 535 engaging and turning differential shaft 506 by gear 551 on differential 560 engaging differential shaft 506 to form gearset 550 with a ratio of 1 to $1/R^{10}$. Gearset 550 connects the third intermediate shaft 505 such that the differential shaft 506 turns at a rate of 1 to $1/R^{10}$ compared to third intermediate shaft 504. Gearset 550 is a unit S2 gearset.

A sliding reverse pinion 507 is also available by design choice to run power from the drive shaft 502 to first intermediate shaft 503 by way of idler gear 508 and reverse gear 509. As can be seen in FIG. 5, the reverse mechanism may have 9 different locations between the 5 shafts to provide 1, 3, 8, or 24 reverse gears.

When the various clutches are selected to operate the various combinations of gears in gearbox 500, twenty-four forward and twenty-four reverse speeds may be selected from in a 1, 1, 3, 8 pattern from unit S1, A, D, and S2 gearsets.

The table in FIG. 5A shows the combinations of pinions selected at the clutches to yield the twenty-four forward and twenty-four reverse speeds. The speeds can be calculated from the combinations of degrees of ratios of the gears and pinions.

There are 48 torques 24 forward and 24 reverse on 25 gears and 5 shafts for a torque to gears and shafts ratio of 48/(25+5)=1.6.

As shown the table in FIG. 5B the combinations of gears yield one gearset $R^3$ in unit S1, three ratios of gearsets from the of three possibilities $R^8$, $1/R^8$ and 1 in unit A, eight ratios of gearsets from the of eight possibilities $1/R$, $1/R^2$, $1/R^3$, $1/R^4$, $1/R^5$, $1/R^6$, $1/R^7$, $1/R^8$ in unit D, and one gearset $1/R^{10}$ in unit S2 for a total of 24 forward gears and 24 reverse gears.

In gearbox 500 the degree of common ratio in the geometric sequence for the 1×1×3×8 gearbox having 24 gears is 8 for unit A, since there 3 gearsets in Unit A and 24 in all. 24/3=8. Therefore the common ratio of gearsets in unit A is a common ratio of $8^{th}$ degree in the geometric sequence. If the first gearset is selected by a ratio of $R^8$ the second gearsets can have a ratio of 1, and the third gearset can have a ratio of $1/R^8$. There are 8 combinations of gearsets remaining and unit D has eight gearsets, 8/8=1, so the gearsets in unit D differ by 1 degree of the common ratio in the geometric sequence. The degrees of common ratio in the geometric sequence were selected by design choice to be $1/R$, $1/R^2$, $1/R^3$, $1/R^4$, $1/R^5$, $1/R^6$, $1/R^7$, and $1/R^8$ in unit D. The standard of fixed gearsets S1 and S2 were selected by design choice to be $R^3$ and $1/R^{10}$. In order to provide a 1 to 1 input to output ratio of the gearbox the units can be selected as $R^3 \times 1/R \times 1/R^{10} \times R^8=1$.

Figure 6:
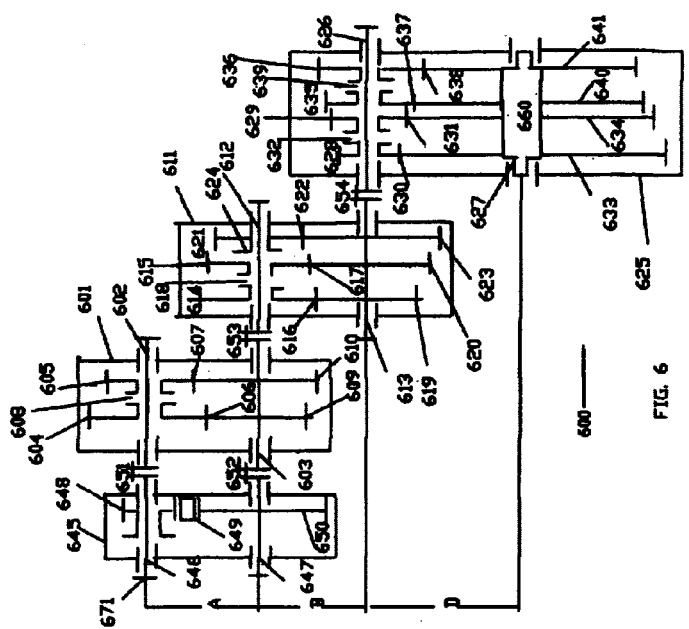
FIG. 6 is a schematic of a gearbox with 4 shafts and 3 units of gearsets therebetween having 2, 3, and 4 gearsets respectively in the units. Three units A, B and D of gearsets having three-separated frames members as frame members of reverse mechanism.

In the sixth embodiment shown in FIG. 6 there are 24 gears of forward and 12 reverse speeds available from gearbox 600. Gearbox 600 has 4 frames members 645, 601, 611 and 625. Supported split drive shaft 646 in frame member 645 is connected by clutch 651 to split drive shaft 602 in frame member 601. First split intermediate shaft 647 in frame member 645 is connected by clutch 652 to first split intermediate shaft 603 in frame member 601, which is connected by clutch 653 to first split intermediate shaft 612 in frame member 611. Second split intermediate shaft 613 in frame member 611 is connected by clutch 654 to second split intermediate shaft 626 in frame member 625. Differential shaft 627 is affixed to differential 660 in frame member 625.

Frame member 645 encompasses split drive shaft 646 supporting reverse pinion 648 engaging idle gear 649 for turning reverse gear 650, fixed to first split intermediate shaft 647. Frame members 601 encompasses split drive shaft 602, first split intermediate shaft 603 and gearsets 606 and 607 as unit A gearsets. Frame member 611 encompasses first split intermediate shaft 612, second split intermediate shaft 613 and gearsets 616, 617 and 622 which are unit B gearsets. Frame member 625 encompasses second split intermediate shaft 626, differential shaft 627 and gearsets 630, 631, 637 and 638 which are unit D Gearsets.

A split drive shaft 646 and first split intermediate shaft 647 have outward ends extending from frame member 645 which are connected by two clutches 651 and 652 to two outward ends of split drive shaft 602 and first split intermediate shaft 603 supported by frame members 601.

The first split intermediate shaft 603 has an outward end extending from frame member 611 connected by clutch 653 to the outward end of first split intermediate shaft 612 in frame member 611. Second split intermediate shaft 613 has an outward end extending from frame members 611 connected by clutch 654 to other outward end of the second split intermediate shaft 626 supported by frame member 625

The power source can be connected to the left side of the gearbox 600 on outward end 671 of the drive shaft 646 or to the right side on outward end 672 of split drive shaft 602. The shafts can be turned around to use the teeth on the opposite side of the gears Split drive shaft 646 is connected by clutch 651 to split drive shaft 602. Split drive shaft 646 passes through reverse pinion 648 and split drive shaft 602 passes through pinions 604, 605 in double synchronizer clutch 608. Pinions 604, 605 and may be separately selected for engaging split drive shaft 602. When reverse pinion 648 is selected it engages and turns split first intermediate shaft 647 connected by clutch 652 to split first intermediate shaft 603. As can be seen in FIG. 6, the reverse mechanism may have 2 locations between 4 shafts supported by 4 frame members having 3 split shafts to provide 4 or 8 reverse gears.

When pinion 604 is selected it engages and turns join gear 609 on split first intermediate shaft 603 to form gearset 606 with a ratio of 1 to $R^6$. When pinion 605 is selected it engages and turns join gear 610 on split first intermediate shaft 603 to form gearset 607 with a ratio of 1 to $1/R^6$. Gearsets 606 and 607 are unit A gearsets.

The outward end of first split intermediate shaft 603 is connected by clutch 653 to the outward end of split intermediate shaft 612.

Frame member 611 encompasses split first intermediate shaft 612 and split second intermediate shaft 613. When pinion 614 on double synchronizer clutch 618 is selected it engages and turns join gear 619 on split second intermediate shaft 613 to form gearset 616 with ratio of 1 to 1. When pinion 615 on double synchronizer clutch 618 is selected it engages and turns join gear 620 on split first intermediate shaft 613 to form gearset 617 with ratio of 1 to $1/R^4$. When pinion 621 on single synchronizer clutch 624 is selected it engages and turns join gear 623 on split first intermediate shaft 613 to form gearset 622 with ratio of 1 to $1/R^8$.

Gearsets 616, 617 and 622 are unit B gearsets.

The outward end of split second intermediate shaft 613 is connected by clutch 654 to the outward end of split second intermediate shaft 626. The frame member 625 encompasses split second intermediate shaft 626, and differential shaft 627 having affixed differential 660.

When pinion 628 on double synchronizer clutch 632 is selected it engages and turns join gear 633 to form gearset 630 with a ratio of 1 to $1/R^9$. When pinion 629 on double synchronizer clutch 632 is selected it engages and turns join gear 634 on differential shaft 627 to form gearset 631 with a ratio of 1 to $1/R^8$.

When pinion 635 on double synchronizer clutch 639 is selected it engages and turns join gear 640 on differential shaft 627 to form gearset 637 with a ratio of 1 to $1/R^7$. When pinion 636 on double synchronizer clutch 639 is selected it engages and turns join gear 641 on differential shaft 627 to form gearset 638 with a ratio of 1 to $1/R^6$.

Gearsets 630, 631, 637 and 638 are unit D gearsets.

When the various clutches are selected to operate the various combinations of gears in the gearbox, twenty-four forward and twenty-four reverse speeds may be selected from in a 2, 3, 4 pattern from unit A, B, and D gearsets.

The table in FIG. 6A shows the combinations of pinions selected at the clutches to yield the twenty-four forward and twelve reverse speeds. The speeds can be calculated from the combinations of degrees of ratios of the gears and pinions.

There are 36 torques 24 forward and 12 reverse on 21 gears and 4 shafts having 3-split shafts supported by 4 frames members for a torques to gears and shafts ratio of 36/(21+5)=1.38.

As shown the table in FIG. 6B the combinations of gears yield two ratios of gearsets from the of two possibilities $R^6$ and $1/R^6$ in unit A, three ratios of gearsets from the of three possibilities $1/R^8$, $1/R^4$ and 1 in unit B, and four ratios of gearsets from the of four possibilities $1/R^6$, $1/R^7$, $1/R^8$ and $1/R^9$ in unit D.

In FIG. 6 the degree of the common ratio in the geometric sequence for the 2×3×4 gearbox having 24 gears, is 12 for unit A, since there a 2 gearsets in unit A and 24 in all, 24/2=12. Therefore the common ratio of gearsets in the unit A is a common ratio of $12^{th}$ degree in the geometric sequence. If the first gearset is selected by a ratio of $R^6$ the second gearset can have a ratio of $1/R^6$.

There are 3 combinations of gearsets remaining and unit B has three gearsets. 12/3=4, so the gearsets in the unit B differ by 4 degree of the common ratio in the geometric sequence. The degrees of common ratio in the geometric sequence were selected by design choice to be 1, $1/R^4$ and $1/R^8$ in unit B.

There are 4 combinations of gearsets remaining and unit D has four gearsets, 4/4=1, so the gearsets in the unit D differ by 1 degree of common ratios in the geometric sequence. The degrees of common ratio in the geometric sequence were selected by design choice to be $1/R^6$, $1/R^7$, $1/R^8$ and $1/R^9$ in unit D. In order to provide a 1 to 1 input to output in gearbox 600 the unit values of $1 \times 1/R^6 \times R^6 = 1$ may be selected.

I claim:

1. A gearbox, comprising,
a plurality of gears forming gearsets, each gearset including at least one shaft extending from the gearset, wherein the gearsets are sized having ratios varying by degrees of separation of a common ratio in a geometric sequence of torques,
wherein, the degrees of separation of the common ratio for each pair of shafts is calculated by dividing a total number of gearset combinations of forward speeds in the gearbox by a number of gearsets between a first pair shafts, where the number of gearsets between two shafts is two or more, and then dividing the common ratio from the first pair of shafts by a number of gearsets between the next pair of shafts until all shaft pairs are calculated, and,
the geometric sequence for each pair of shafts allows a final gearbox ratio of 1.

2. A gearbox comprising:
a plurality of gears forming gearsets, each gearset including at least one shaft extending from the gearset, wherein the gearsets are sized having ratios varying by degrees of separation of a common ratio in a geometric sequence, wherein
the gearbox includes no more than thirteen gearsets and the gearsets are configured to form the gearbox as comprising 24 forward torques;
R is a common ratio in a geometric sequence, the gearbox further comprising:
a first frame member that includes a first gearset unit having gearsets sized to have a common ratio selected from the group consisting of $1/R^{12}$, $1/R^8$ and $1/R^6$;
a second frame member that includes a second gearset unit having gearsets sized to have a common ratio selected from the group consisting of $1/R^4$, $1/R^2$ and $1/R^3$;
a third frame member that includes a third gearset unit having gearsets sized to have a common ratio of $1/R$; and
a fourth frame member that includes a reverse pinion idle gear and a reverse gear coupled to a powered source producing 12 reverse torques.

3. A gearbox comprising:
a plurality of gears forming gearsets, each gearset including at least one shaft extending from the gearset, wherein the gearsets are sized having ratios varying by degrees of separation of a common ratio in a geometric sequence, wherein
the gearbox includes no more than thirteen gearsets and the gearsets are configured to form the gearbox as comprising 24 forward torques;
wherein R is a common ratio in a geometric sequence, the gearbox further comprising:
a frame member comprising 3 units of gearsets including:
a first unit having gearsets sized to have a common ratio selected from the group consisting of $1/R^{12}$ and $1/R^4$;
a second unit having gearsets sized to have a common ratio selected from the group consisting of $1/R^6$ and $1/R^2$; and
a third unit having gearsets sized to have a common ratio of $1/R$, and a reverse pinion coupled to a power source to produce 12 reverse torques.

4. A gearbox comprising:
a plurality of gears forming gearsets, each gearset including at least one shaft extending from the gearset, wherein the gearsets are sized having ratios varying by degrees of separation of a common ratio in a geometric sequence, wherein R is a common ratio in a geometric sequence, the gearbox further comprising:
a frame member includes 4 units of gearsets and 5 shafts including:
a first unit having gearsets sized to have a common ratio selected from the group consisting of $R^0$, $1/R^8$ and $1/R^3$;
a second unit having gearsets sized to have a common ratio selected from the group consisting of $R^0$, $1/R^8$ and $1/R^3$;
a third unit having gearsets sized to have a common ratio selected from the group consisting of $1/R^8$, $R^0$, and $1/R$; and
a fourth unit having gearsets sized to have a common ratio of $R^0$ and $1/R$, and a reverse pinion coupled to a power source to produce 24 reverse torques.

5. A gearbox comprising:
a plurality of gears forming gearsets, each gearset including at least one shaft extending from the gearset, wherein the gearsets are sized having ratios varying by degrees of separation of a common ratio in a geometric sequence, wherein R is a common ratio in a geometric sequence, the gearbox further comprising:
a frame member comprising 4 units of gearsets and 5 shafts, including a first input shaft and a second split input shaft such that the gearbox produces an additional 12 forward torques; and
a first unit having a gearsets sized to have a common ratio of $R^0$;
a second unit having 2 gearsets sized to have a common ratio of $1/R^{12}$;
a third unit of gearsets having gearsets sized to have a common ratio selected from the group consisting of $1/R^4$ and $1/R^3$; and a fourth unit of gearsets having gearsets sized to have a common ratio of 1/R, and a reverse pinion coupled to powered source to produce 24 reverse speeds.

6. A method of gearbox design comprising:

selecting a number of torques for the gearbox;

determining a number of gearset units based upon a multiplier number representative of the number of torques selected;

providing a number of gearsets in each gearset unit based upon the number of torques selected;

determining a number of shafts equal to the number of gearset units plus one;

determining a degree of separation of a common ratio in a geometric sequence for each gearset unit by dividing the number of torques selected by the number of gearsets in a first gearset unit, and then dividing a remainder of the degree of separation of the common ratio by the number of gearsets in a second gearset unit; and repeating a division step for remaining units until the degree of separation of the common ratio equals one.

7. A gearbox as in claim 1 wherein the geometric sequence of torques is $1/R^n$, where R is common ratio forming a geometric sequence of forward speeds, 1/R is common ratio forming a geometric sequence of forward torques, and n is the degrees of separation of a common ratio.

8. A gearbox as in claim 1 wherein, the degrees of separation of the common ratio in the geometric sequence for all gearsets is the same.

9. A gearbox as in claim 1 wherein, a first join gear on a second shaft of the gearbox engages a pinion of a first gearset on a first shaft and a gearwheel of a second gearset on a third shaft such that the join gear is part of two gearsets of two adjacent gearset units.

10. A gearbox as in claim 9 wherein, a pair of adjacent join gears on a shaft employs an addendum modification shift to account for a difference in gear teeth sizes of four gearsets installed on three adjacent shafts such that all gear teeth are configured to mesh.

11. A gearbox as in claim 1 wherein, a reverse pinion engages one gearset on an adjacent pair of shafts for providing one or more reverse speeds.

12. A gearbox as in claim 1 wherein, a differential is affixed to at least one shaft of an adjacent pair of shafts.

13. A gearbox as in claim 1 wherein,

The gearbox has at least one frame member.

14. A gearbox as in claim 13 wherein, the gearbox has more than one frame member.

15. A gearbox as in claim 1 wherein, at least one shaft of an adjacent pair of shafts has at least one outward end extending from the gearbox for connecting to other objects.

16. A gearbox as in claim 15 wherein, the at least one shaft of the adjacent pairs of shafts has two outward ends and a gear disposed on each of the respective outward ends configured to connect to a powered source and able to be turned over to permit use of a previously unused side of teeth.

17. A gearbox as in claim 1 wherein, the gearbox has at least one split shaft and a clutch coupled to the split shafts.

* * * * *